United States Patent
Terakawa et al.

(10) Patent No.: US 11,031,033 B2
(45) Date of Patent: Jun. 8, 2021

(54) MAGNETIC RECORDING MEDIUM AND CARTRIDGE

(71) Applicant: Sony Corporation, Tokyo (JP)

(72) Inventors: Masaru Terakawa, Miyagi (JP); Minoru Yamaga, Miyagi (JP); Takanobu Iwama, Miyagi (JP); Jun Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/969,876

(22) PCT Filed: Feb. 18, 2019

(86) PCT No.: PCT/JP2019/005895
§ 371 (c)(1),
(2) Date: Aug. 13, 2020

(87) PCT Pub. No.: WO2019/160145
PCT Pub. Date: Aug. 22, 2019

(65) Prior Publication Data
US 2021/0012805 A1    Jan. 14, 2021

(30) Foreign Application Priority Data
Feb. 16, 2018  (JP) .............................. JP2018-026508

(51) Int. Cl.
*G11B 23/07* (2006.01)
*G11B 5/78* (2006.01)
(Continued)

(52) U.S. Cl.
CPC ........ *G11B 5/5928* (2013.01); *G11B 5/00813* (2013.01); *G11B 5/00817* (2013.01);
(Continued)

(58) Field of Classification Search
CPC .... G11B 5/75; G11B 5/73; G11B 5/78; G11B 5/645; G11B 5/627; G11B 5/7021;
(Continued)

(56) References Cited

U.S. PATENT DOCUMENTS 7,267,896 B2 * 9/2007 Kuse ...................... B82Y 25/00
428/839.3
2002/0027732 A1   3/2002 Arita et al.
(Continued)

FOREIGN PATENT DOCUMENTS

JP    2002083412 A    3/2002
JP    2005038579 A    2/2005
(Continued)

OTHER PUBLICATIONS

International Search Report issued in Application No. PCT/JP2019/005895, dated Mar. 12, 2019.

*Primary Examiner* — Nabil Z Hindi
(74) *Attorney, Agent, or Firm* — K&L Gates LLP

(57) ABSTRACT

[Object] Provided is a technology that is capable of further improving a recording density of data.
[Solving Means] A magnetic recording medium according to the present technology is a magnetic recording medium in a shape of a tape that is long in a longitudinal direction and is short in a width direction, the medium including: a base material; a magnetic layer; and a non-magnetic layer that is provided between the base material and the magnetic layer, and contains one or more types of non-magnetic inorganic particles, in which the magnetic layer includes a data band long in the longitudinal direction in which a data signal is to be written, and a servo band long in the longitudinal direction in which a servo signal is written, and in the magnetic layer, a degree of vertical orientation is greater than or equal to 65%, a half width of a solitary waveform in a reproduction waveform of the servo signal is less than or (Continued)

equal to 195 nm, and a thickness of the magnetic layer is less than or equal to 90 nm, and the non-magnetic layer contains at least Fe-based non-magnetic particles as the non-magnetic inorganic particles, and in the non-magnetic layer, an average particle volume of the Fe-based non-magnetic particles is less than or equal to $2.0 \times 10^{-5}$ µm$^3$, and a thickness of the non-magnetic layer is less than or equal to 1.1 µm.

23 Claims, 10 Drawing Sheets

(51) Int. Cl.
G11B 5/733 (2006.01)
G11B 5/592 (2006.01)
G11B 5/706 (2006.01)
G11B 5/008 (2006.01)
G11B 5/584 (2006.01)
G11B 20/12 (2006.01)

(52) U.S. Cl.
CPC .......... G11B 5/584 (2013.01); G11B 5/70621 (2013.01); G11B 5/70678 (2013.01); G11B 5/733 (2013.01); G11B 20/1202 (2013.01)

(58) Field of Classification Search
CPC ........... G11B 5/553; G11B 5/70; G11B 5/708; G11B 5/667; G11B 5/62; G11B 5/70678; G11B 5/733; G11B 5/00813; G11B 5/70621; G11B 5/584; G11B 5/00817
USPC .................................................. 360/134, 48
See application file for complete search history.

(56) References Cited

U.S. PATENT DOCUMENTS

| | | |
|---|---|---|
| 2004/0265644 A1 | 12/2004 | Tsujimoto et al. |
| 2008/0117539 A1 | 5/2008 | Bui et al. |
| 2014/0268414 A1 | 9/2014 | Nakashio et al. |
| 2017/0372741 A1 | 12/2017 | Kurokawa et al. |

FOREIGN PATENT DOCUMENTS

| | | |
|---|---|---|
| JP | 2010132475 A | 6/2010 |
| JP | 2014199706 A | 10/2014 |
| JP | 2017228336 A | 12/2017 |

* cited by examiner

| | Degree of vertical orientation % | Degree of longitudinal orientation % | Distance D Recording track width % | Distance D μm | Recording track width μm | Shape of magnetic powder Contained elements other than Fe | Half width of solitary waveform nm | Shape | Aspect ratio | Particle volume nm3 | Thickness of magnetic layer nm | Note |
|---|---|---|---|---|---|---|---|---|---|---|---|---|
| Example 1 | 65 | 35 | 21.3 | 0.12 | 0.56 | Hexagonal plate-like Ba | 180 | Plate-like shape | 2.8 | 1950 | 80 | To be reference |
| Example 2 | 68 | 31 | 21.3 | 0.12 | 0.56 | Hexagonal plate-like Ba | 160 | Plate-like shape | 2.8 | 1950 | 80 | Increase degree of vertical orientation |
| Example 3 | 70 | 29 | 21.3 | 0.12 | 0.56 | Hexagonal plate-like Ba | 150 | Plate-like shape | 2.8 | 1950 | 80 | Further increase degrees of vertical orientation |
| Example 4 | 71 | 25 | 21.3 | 0.12 | 0.56 | Hexagonal plate-like Ba | 140 | Plate-like shape | 2.8 | 1950 | 80 | Further increase degrees of vertical orientation |
| Example 5 | 68 | 31 | 44.5 | 0.25 | 0.56 | Hexagonal plate-like Ba | 180 | Plate-like shape | 2.8 | 1950 | 80 | Azimuth angle of 24 degrees |
| Example 6 | 68 | 31 | 44.5 | 0.64 | 1.21 | Hexagonal plate-like Ba | 180 | Plate-like shape | 2.8 | 1950 | 80 | Azimuth angle of 24 degrees and different recording track width |
| Example 7 | 68 | 31 | 44.5 | 0.17 | 0.38 | Hexagonal plate-like Ba | 180 | Plate-like shape | 2.8 | 1950 | 80 | Azimuth angle of 24 degrees and different recording track width |
| Example 8 | 68 | 31 | 32.5 | 0.54 | 1.66 | Hexagonal plate-like Ba | 170 | Plate-like shape | 2.8 | 1950 | 80 | Azimuth angle of 18 degrees |
| Example 9 | 68 | 31 | 32.5 | 0.25 | 0.77 | Hexagonal plate-like Ba | 170 | Plate-like shape | 2.8 | 1950 | 80 | Azimuth angle of 18 degrees and different recording track width |
| Example 10 | 68 | 31 | 21.3 | 0.17 | 0.52 | Hexagonal plate-like Ba | 170 | Plate-like shape | 2.8 | 1950 | 80 | Azimuth angle of 18 degrees and different recording track width |
| Example 11 | 68 | 31 | 21.3 | 0.62 | 2.91 | Hexagonal plate-like Ba | 160 | Plate-like shape | 2.8 | 1950 | 80 | Different recording track width |
| Example 12 | 68 | 31 | 21.3 | 0.33 | 1.55 | Hexagonal plate-like Ba | 160 | Plate-like shape | 2.8 | 1950 | 80 | Different recording track width |
| Example 13 | 68 | 31 | 21.3 | 0.12 | 0.56 | Hexagonal plate-like Ba | 160 | Plate-like shape | 2.8 | 1950 | 80 | Different recording track width |
| Example 14 | 68 | 31 | 21.3 | 0.08 | 0.33 | Hexagonal plate-like Ba | 160 | Plate-like shape | 2.8 | 1950 | 80 | Different recording track width |
| Example 15 | 68 | 31 | 21.3 | 0.12 | 0.56 | Hexagonal plate-like Sr | 160 | Plate-like shape | 2.8 | 2000 | 80 | Different magnetic particles |
| Example 16 | 68 | 31 | 21.3 | 0.12 | 0.56 | No spherical shape | 160 | Spherical shape | 1.1 | 2150 | 80 | Different magnetic particles |
| Example 17 | 68 | 31 | 21.3 | 0.12 | 0.56 | Spherical Ga | 160 | Spherical shape | 1 | 2150 | 80 | Different magnetic particles |
| Example 18 | 68 | 31 | 21.3 | 0.12 | 0.56 | Cubical Co | 180 | Cubical shape | 1.7 | 2200 | 80 | Different magnetic particles |
| Comparative Example 1 | 55 | 45 | 21.3 | 0.12 | 0.56 | Hexagonal plate-like Ba | 220 | Plate-like shape | 2.8 | 1950 | 80 | |
| Comparative Example 2 | 61 | 40 | 21.3 | 0.12 | 0.56 | Hexagonal plate-like Ba | 200 | Plate-like shape | 2.8 | 1950 | 80 | |
| Comparative Example 3 | 68 | 31 | 21.3 | 0.06 | 0.28 | Hexagonal plate-like Ba | 160 | Plate-like shape | 2.8 | 1950 | 80 | System is broken down |

FIG. 11

| | Degree of vertical orientation % | Degree of longitudinal orientation % | Distance D Recording track width % | Distance D μm | Recording track width μm | Shape of magnetic powder Contained elements other than Fe | Half width of solitary waveform nm | Shape | Aspect ratio | Particle volume nm3 | Thickness of magnetic layer nm | Note |
|---|---|---|---|---|---|---|---|---|---|---|---|---|
| Example 19 | 75 | 23 | 21.3 | 0.12 | 0.56 | Hexagonal plate-like Ba | 138 | Plate-like shape | 2.8 | 1950 | 80 | Further increase degree of vertical orientation |
| Example 20 | 80 | 21 | 21.3 | 0.12 | 0.56 | Hexagonal plate-like Ba | 130 | Plate-like shape | 2.8 | 1950 | 80 | Further increase degree of vertical orientation |
| Example 21 | 85 | 18 | 21.3 | 0.12 | 0.56 | Hexagonal plate-like Ba | 119 | Plate-like shape | 2.8 | 1950 | 80 | Further increase degree of vertical orientation |
| Example 22 | 65 | 35 | 21.3 | 0.12 | 0.56 | Hexagonal plate-like Ba | 130 | Plate-like shape | 2.5 | 1600 | 80 | Decrease particle volume |
| Example 23 | 65 | 35 | 21.3 | 0.12 | 0.56 | Hexagonal plate-like Ba | 125 | Plate-like shape | 2.3 | 1300 | 80 | Further decrease particle volume |
| Example 24 | 75 | 23 | 21.3 | 0.12 | 0.56 | Hexagonal plate-like Ba | 120 | Plate-like shape | 2.8 | 1950 | 80 | Increase degree of vertical orientation and decrease thickness of magnetic layer |
| Example 25 | 80 | 21 | 21.3 | 0.12 | 0.56 | Hexagonal plate-like Ba | 100 | Plate-like shape | 2.8 | 1950 | 40 | Increase degree of vertical orientation and further decrease thickness of magnetic layer |
| Comparative Example 4 | 65 | 35 | 21.3 | 0.12 | 0.56 | Hexagonal plate-like Ba | 210 | Plate-like shape | 2.8 | 2500 | 80 | Increase particle volume |
| Comparative Example 5 | 65 | 35 | 21.3 | 0.12 | 0.56 | Hexagonal plate-like Ba | 220 | Plate-like shape | 2.8 | 2600 | 80 | Further increase particle volume |

FIG. 12

| Non-magnetic powder ($\alpha$-$Fe_2O_3$) | Long axis length [nm] | Short axis length [nm] | Aspect ratio (long axis length/ short axis length) | Average particle volume [$\mu m^3$] |
|---|---|---|---|---|
| 1 | 110 | 18 | 6.1 | 1.80E-05 |
| 2 | 74 | 12.9 | 5.7 | 6.50E-06 |
| 3 | 38 | 20 | 1.9 | 8.00E-06 |
| 4 | 24 | 13 | 1.8 | 2.10E-06 |
| 5 | 21 | 11 | 1.9 | 1.30E-06 |
| 6 | 12 | 6 | 2 | 2.30E-07 |

FIG.13

| | Non-magnetic powder No. | Tape layer configuration | | | | | Evaluation |
|---|---|---|---|---|---|---|---|
| | | Magnetic layer [nm] | Non-magnetic layer [$\mu m$] | Base material [$\mu m$] | Back layer [$\mu m$] | Total thickness [$\mu m$] | Arithmetic average roughness Ra[nm] |
| Sample 1 | 1 | 80 | 1.1 | 4 | 0.4 | 5.58 | 1.90 |
| Sample 2 | 2 | 60 | 0.8 | 3.8 | 0.4 | 4.66 | 1.82 |
| Sample 3 | 3 | 70 | 1.1 | 4 | 0.4 | 5.57 | 1.70 |
| Sample 4 | 4 | 70 | 0.8 | 4 | 0.4 | 5.07 | 1.82 |
| Sample 5 | 5 | 70 | 1.1 | 3.8 | 0.4 | 5.17 | 1.60 |
| Sample 6 | 3 | 70 | 0.8 | 4 | 0.4 | 5.07 | 1.79 |
| Sample 7 | 4 | 70 | 0.8 | 3.8 | 0.4 | 4.87 | 1.66 |
| Sample 8 | 5 | 70 | 0.8 | 3.8 | 0.4 | 5.07 | 1.58 |

FIG.14

MAGNETIC RECORDING MEDIUM AND CARTRIDGE

TECHNICAL FIELD

The present technology relates to a technology of a magnetic recording medium or the like.

BACKGROUND ART

Recently, a magnetic recording medium has been widely used for an application such as electronic data backup. A magnetic recording medium including a magnetic layer has been in widespread use, as one of the magnetic recording media.

A data band including a plurality of recording tracks is provided in the magnetic layer of the magnetic recording medium, and data is recorded in the recording track. In addition, in the magnetic layer, a servo band is provided in positions between which the data band is interposed in a width direction, and a servo signal is recorded in the servo band. A magnetic head reads the servo signal that is recorded in the servo band, and thus, positioning is performed with respect to the recording track.

A horizontal magnetic recording system in which data is recorded by magnetizing magnetic particles in a magnetic layer in a horizontal direction, and a vertical magnetic recording system in which data is recorded by magnetizing the magnetic particles in the magnetic layer in a vertical direction are known as a recording system with respect to the magnetic recording medium. In the vertical magnetic recording system, it is possible to record the data with a high density, compared to the horizontal magnetic recording system.

CITATION LIST

Patent Literature

Patent Literature 1: JP-A-2014-199706

DISCLOSURE OF INVENTION

Technical Problem

Recently, higher density recording has been required due to an increase in a data amount to be recorded, and a technology that is capable of further improving a recording density of data has been required.

In consideration of the circumstances as described above, an object of the present technology is to provide a technology that is capable of further improving a recording density of data.

Solution to Problem

A magnetic recording medium according to one aspect of the present technology is a magnetic recording medium in a shape of a tape that is long in a longitudinal direction and is short in a width direction, the medium including: a base material; a magnetic layer; and a non-magnetic layer that is provided between the base material and the magnetic layer, and contains one or more types of non-magnetic inorganic particles, in which the magnetic layer includes a data band long in the longitudinal direction in which a data signal is to be written, and a servo band long in the longitudinal direction in which a servo signal is written, and in the magnetic layer, a degree of vertical orientation is greater than or equal to 65%, a half width of a solitary waveform in a reproduction waveform of the servo signal is less than or equal to 195 nm, and a thickness of the magnetic layer is less than or equal to 90 nm, and the non-magnetic layer contains at least Fe-based non-magnetic particles as the non-magnetic inorganic particles, and in the non-magnetic layer, an average particle volume of the Fe-based non-magnetic particles is less than or equal to $2.0 \times 10^{-5}$ μm$^3$, and a thickness of the non-magnetic layer is less than or equal to 1.1 μm.

Accordingly, it is possible to further improve a recording density of data.

In the magnetic recording medium described above, the average particle volume of the Fe-based non-magnetic particles may be less than or equal to $1.0 \times 10^{-5}$ μm$^3$.

In the magnetic recording medium described above, the half width of the solitary waveform may be less than or equal to 180 nm.

In the magnetic recording medium described above, the half width of the solitary waveform may be less than or equal to 160 nm.

In the magnetic recording medium described above, the half width of the solitary waveform may be less than or equal to 140 nm.

In the magnetic recording medium described above, the half width of the solitary waveform may be less than or equal to 120 nm.

In the magnetic recording medium described above, the degree of vertical orientation may be greater than or equal to 70%.

In the magnetic recording medium described above, the degree of vertical orientation may be greater than or equal to 75%.

In the magnetic recording medium described above, the degree of vertical orientation may be greater than or equal to 80%.

In the magnetic recording medium described above, the data band may include a plurality of recording tracks that are long in the longitudinal direction, are arrayed in the width direction, and have a predetermined recording track width for each track in the width direction, a servo signal recording pattern may include a plurality of stripes that are inclined at a predetermined azimuth angle with respect to the width direction, and when an arbitrary point on an arbitrary stripe in the plurality of stripes is set to P1, and a point on the arbitrary stripe in a position separated from P1 by the recording track width in the width direction is set to P2, a distance between P1 and P2 in the length direction may be greater than or equal to 0.08 μm.

In the magnetic recording medium described above, the distance between P1 and P2 in the length direction may be less than or equal to 0.62 μm.

In the magnetic recording medium described above, in the magnetic layer, a degree of longitudinal orientation may be less than or equal to 35%.

In the magnetic recording medium described above, a coercive force in the longitudinal direction may be less than or equal to 2000 Oe.

In the magnetic recording medium described above, a ratio of an area of the servo band to an area of an entire surface of the magnetic layer may be less than or equal to 4.0%.

In the magnetic recording medium described above, the magnetic layer may contain a magnetic powder, and a particle volume of the magnetic powder may be less than or equal to 2300 nm$^3$.

In the magnetic recording medium described above, the number of data bands is 4n (n is an integer of greater than or equal to 2), and the number of servo bands may be 4n+1.

In the magnetic recording medium described above, a width of the servo band may be less than or equal to 95 μm.

In the magnetic recording medium described above, the data band may include a plurality of recording tracks that are long in the longitudinal direction, are arrayed in the width direction, and have a predetermined recording track width for each track in the width direction, and the recording track width may be less than or equal to 2.0 μm.

In the magnetic recording medium described above, a one-bit length in the longitudinal direction of the data signal that is recorded in the data band may be less than or equal to 48 nm.

In the magnetic recording medium described above, the magnetic layer may contain a magnetic powder of hexagonal ferrite, ε ferric oxide, or cobalt-containing ferrite.

In the magnetic recording medium described above, a thickness of the base material may be less than or equal to 4.2 μm.

In the magnetic recording medium described above, the Fe-based non-magnetic inorganic particles may be hematite ($\alpha$-$Fe_2O_3$).

A cartridge according to another aspect of the present technology is a cartridge including:

a magnetic recording medium in a shape of a tape that is long in a longitudinal direction and being short in a width direction, the magnetic recording medium including a base material, a magnetic layer, and a non-magnetic layer that is provided between the base material and the magnetic layer, and contains one or more types of non-magnetic inorganic particles, in which the magnetic layer includes a data band long in the longitudinal direction in which a data signal is to be written, and a servo band long in the longitudinal direction in which a servo signal is written, and in the magnetic layer, a degree of vertical orientation is greater than or equal to 65%, a half width of a solitary waveform in a reproduction waveform of the servo signal is less than or equal to 195 nm, and a thickness of the magnetic layer is less than or equal to 90 nm, and the non-magnetic layer contains at least Fe-based non-magnetic particles as the non-magnetic inorganic particles, and in the non-magnetic layer, an average particle volume of the Fe-based non-magnetic particles is less than or equal to $4.0 \times 10^{-5}$ μm$^3$, and a thickness of the non-magnetic layer is less than or equal to 1.0 μm.

Advantageous Effects of Invention

According to the present technology, it is possible to further improve a recording density of data.

BRIEF DESCRIPTION OF DRAWINGS

FIG. 11 is a diagram illustrating various examples and various comparative examples.

FIG. 12 is a diagram illustrating other various examples and other various comparative examples.

FIG. 13 is a diagram illustrating an example of non-magnetic particles that are contained in a non-magnetic layer.

FIG. 14 is a diagram illustrating a test result indicating a relationship in a thickness of each layer configuring the magnetic recording medium, an average particle volume of the non-magnetic particles that are contained in the non-magnetic layer, and arithmetic average roughness Ra of a surface of a magnetic layer.

MODE(S) FOR CARRYING OUT THE INVENTION

Hereinafter, embodiments according to the present technology will be described with reference to the drawings.

<Configuration of Magnetic Recording Medium>

Figure 1:
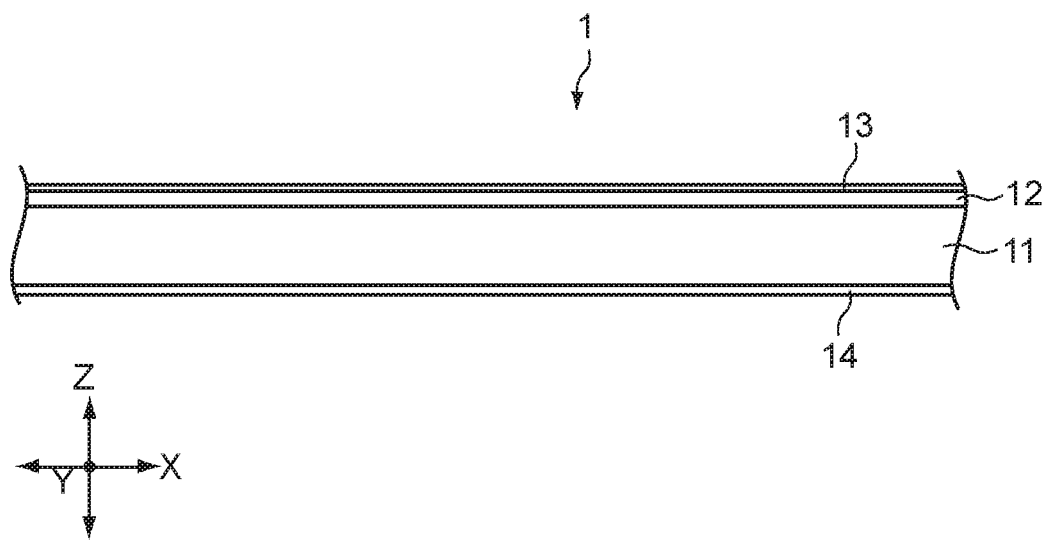
FIG. 1 is a schematic diagram of a magnetic recording medium seen from a lateral side.

First, a basic configuration of a magnetic recording medium 1 will be described. FIG. 1 is a schematic diagram of the magnetic recording medium 1 seen from a lateral side.

Figure 2:
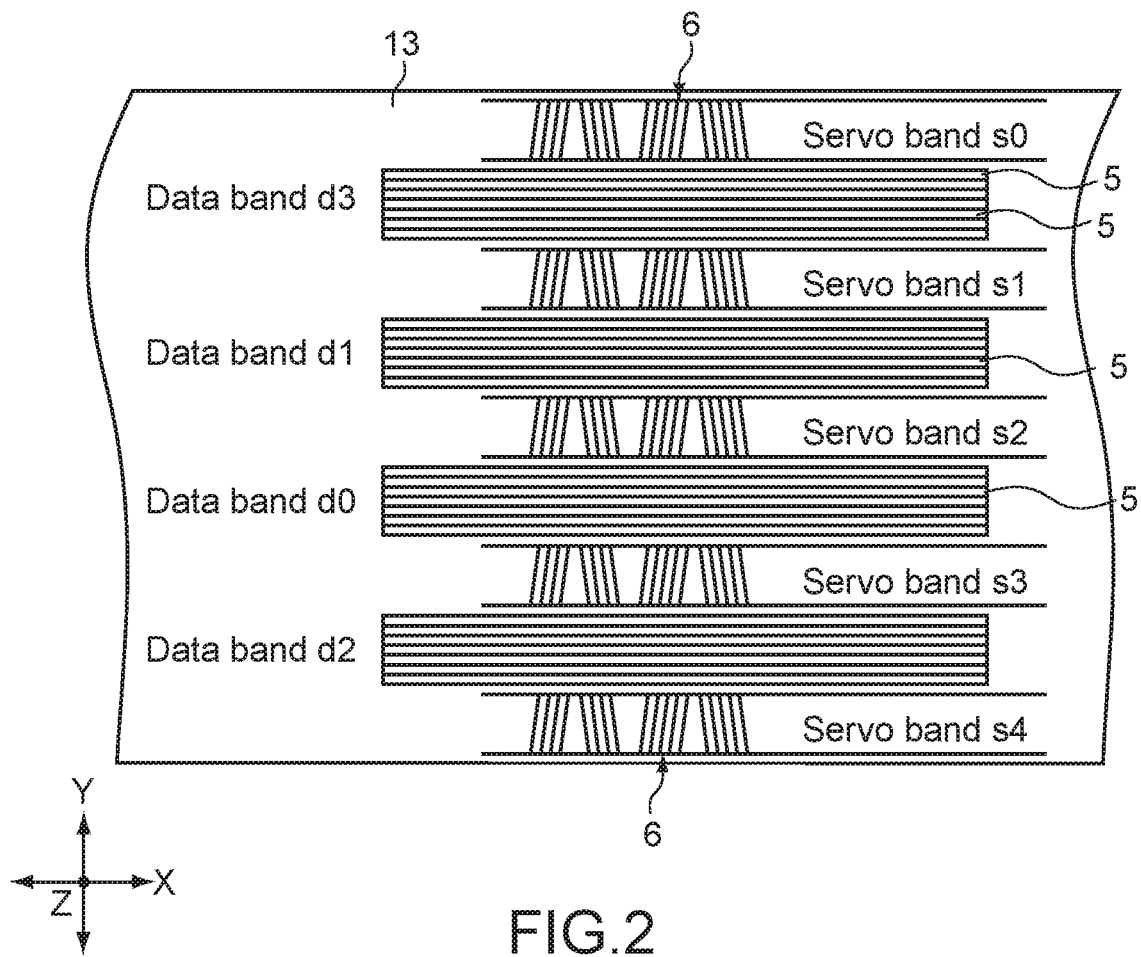
FIG. 2 is a schematic diagram of the magnetic recording medium seen from an upper side.

As illustrated in FIG. 1 and FIG. 2, the magnetic recording medium 1 is configured into the shape of a tape that is long in a longitudinal direction (an X axis direction), is short in a width direction (a Y axis direction), and is thin in a thickness direction (a Z axis direction). Note that, in the specification (and the drawings), a coordinate system based on the magnetic recording medium 1 indicates an XYZ coordinate system.

The magnetic recording medium 1 is capable of recording a signal at the shortest recording wavelength that is desirably less than or equal to 96 nm, is more desirably less than or equal to 75 nm, is even more desirably less than or equal to 60 nm, and is particularly desirably less than or equal to 50 nm. It is desirable that the magnetic recording medium 1 is used in a data recording device including a ring type head as a recording head.

The magnetic recording medium 1 includes a base material 11 in the shape of a tape that is long in the longitudinal direction (the X axis direction), a non-magnetic layer 12 provided on one main surface of the base material 11, a magnetic layer 13 provided on the non-magnetic layer 12, and a back layer 14 provided on the other main surface of the base material 11, with reference to FIG. 1. Note that, the back layer 14 may be provided as necessary, and the back layer 14 may be omitted.

[Base Material]

The base material 11 is a non-magnetic support body that supports the non-magnetic layer 12 and the magnetic layer 13. The base material 11 is in the shape of an elongated film. An upper limit value of an average thickness of the base material 11 is desirably less than or equal to 4.2 μm, is more desirably less than or equal to 3.8 μm, and is even more desirably less than or equal to 3.4 μm. In a case where the upper limit value of the average thickness of the base material 11 is less than or equal to 4.2 μm, it is possible to increase recording capacity that is capable of performing recording in one cartridge 21 (refer to FIG. 5), compared to a general magnetic recording medium.

The average thickness of the base material 11 is obtained as follows. First, the magnetic recording medium 1 having a width of ½ inches is prepared, and the magnetic recording medium 1 is cut out to have a length of 250 mm, and thus, a sample is prepared. Subsequently, layers of the sample other than the base material 11 (that is, the non-magnetic layer 12, the magnetic layer 13, and the back layer 14) are removed by a solvent such as methyl ethyl ketone (MEK) or a dilute hydrochloric acid. Next, the thickness of the sample (the base material 11) is measured in five or more positions by using laser HOLOGaze manufactured by Mitutoyo Corporation as a measurement device, and measurement values are simply averaged (arithmetically averaged), and thus, the average thickness of the base material 11 is calculated. Note that, the measurement position is randomly selected from the sample.

The base material 11, for example, includes at least one type of material of polyesters, polyolefins, a cellulose derivative, a vinylic resin, or other polymer resins. In a case where the base material 11 includes two or more types of materials of the materials described above, two or more types of materials may be mixed, may be copolymerized, or may be laminated.

Polyesters, for example, include at least one type of polyester of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), or polyethylene bisphenoxy carboxylate.

Polyolefins, for example, include at least one type of polyolefin of polyethylene (PE) or polypropylene (PP). The cellulose derivative, for example, includes at least one type of cellulose derivative of cellulose diacetate, cellulose triacetate, cellulose acetate butyrate (CAB), or cellulose acetate propionate (CAP). The vinylic resin, for example, includes at least one type of vinylic resin of polyvinyl chloride (PVC) or polyvinylidene chloride (PVDC).

The other polymer resins, for example, include at least one type of polymer resin of polyamide, nylon (PA), aromatic polyamide (aromatic PA, aramid), polyimide (PI), aromatic polyimide (aromatic PI), polyamide imide (PAI), aromatic polyamide imide (aromatic PAI), polybenzooxazole (PBO, for example, Xyron (Registered Trademark)), polyether, polyether ketone (PEK), polyether ester, polyether sulfone (PES), polyether imide (PEI), polysulfone (PSF), polyphenylene sulfide (PPS), polycarbonate (PC), polyarylate (PAR), or polyurethane (PU).

[Magnetic Layer]

The magnetic layer 13 is a recording layer for recording a data signal. The magnetic layer 13 contains a magnetic powder, a binder, conductive particles, and the like. The magnetic layer 13 may contain an additive such as a lubricant, an abrading agent, and an antirust agent, as necessary. The magnetic layer 13 includes a surface on which a plurality of hole portions are provided. The lubricant is stored in the plurality of hole portions. It is desirable that the plurality of hole portions extend in a direction vertical to the surface of the magnetic layer.

The degree of vertical orientation of the magnetic layer 13 (no diamagnetic field correction: the same hereinafter) is typically greater than or equal to 65%. In addition, the degree of longitudinal orientation of the magnetic layer 13 is typically less than or equal to 35%.

The thickness of the magnetic layer 13 is typically greater than or equal to 35 nm and less than or equal to 90 nm. As described above, the thickness of the magnetic layer 13 is greater than or equal to 35 nm and less than or equal to 90 nm, and thus, it is possible to improve electromagnetic conversion characteristics. Further, the thickness of the magnetic layer 13 is desirably less than or equal to 90 nm, is more desirably less than or equal to 80 nm, is more desirably less than or equal to 60 nm, and is even more desirably less than or equal to 40 nm, from the viewpoint of a half width (described below) of a solitary waveform in a reproduction waveform of a servo signal. The thickness of the magnetic layer 13 is less than or equal to 90 nm, and thus, it is possible to narrow the half width of the solitary waveform in the reproduction waveform of the servo signal (less than or equal to 195 nm), and to make a peak of the reproduction waveform of the servo signal sharp. Accordingly, a reading accuracy of the servo signal is improved, and thus, it is possible to increase the number of recording tracks, and to improve a recording density of data (the details will be described below).

The thickness of the magnetic layer 13, for example, can be obtained as follows. First, the magnetic recording medium 1 is worked to be vertically thin with respect to the main surface, and a sample piece is prepared, and a sectional surface of the test piece is observed with a transmission electron microscope (TEM) in the following conditions.

Device: TEM (H9000NAR, manufactured by Hitachi, Ltd.)

Acceleration Voltage: 300 kV

Magnification: 100,000 Times

Next, the thickness of the magnetic layer 13 is measured in at least 10 or more positions in the longitudinal direction of the magnetic recording medium 10 by using a TEM image that is obtained, and then, measurement values are simply averaged (arithmetically averaged), and thus, the thickness of the magnetic layer 13 is calculated. Note that, the measurement position is randomly selected from the test piece.

(Magnetic Powder)

The magnetic powder includes a powder of nanoparticles containing ε ferric oxide (hereinafter, referred to as "ε ferric oxide particles"). Even though the ε ferric oxide particles are fine particles, it is possible to obtain a high coercive force. It is desirable that ε ferric oxide contained in the ε ferric oxide particles is subjected to crystalline orientation preferentially in the thickness direction (a vertical direction) of the magnetic recording medium 1.

The ε ferric oxide particles are in the shape of a sphere or approximately in the shape of a sphere, or in the shape of a cube or approximately in the shape of a cube. The ε ferric oxide particles have the shape as described above, and thus, in a case where the ε ferric oxide particles are used as magnetic particles, it is possible to reduce a contact area between particles in the thickness direction of the magnetic recording medium 1, and to suppress aggregation between the particles, compared to a case where hexagonal plate-like barium ferrite particles are used as the magnetic particles. Therefore, it is possible to increase the dispersibility of the magnetic powder, and to obtain a more excellent signal-to-noise ratio (SNR).

The ε ferric oxide particles have a core-shell type structure. Specifically, the ε ferric oxide particles include a core portion, and a shell portion of a two-layer structure that is provided around the core portion. The shell portion of the two-layer structure includes a first shell portion provided on the core portion, and a second shell portion provided on the first shell portion.

The core portion contains ε ferric oxide. It is desirable that ε ferric oxide contained in the core portion has ε-$Fe_2O_3$ crystals as a main phase, and it is more desirable that ε ferric oxide is formed of α-Fe$_2$O$_3$ of a single phase.

The first shell portion covers at least a part of the periphery of the core portion. Specifically, the first shell portion may partially cover the periphery of the core portion, or may cover the entire periphery of the core portion. It is desirable that the first shell portion covers the entire surface of a core portion 21, from the viewpoint of making exchange coupling between the core portion and the first shell portion sufficient, and of improving magnetic properties.

The first shell portion is a so-called soft magnetic layer, and for example, contains a soft magnetic body such as α-Fe, an Ni—Fe alloy, and an Fe—Si—Al alloy. α-Fe may be obtained by reducing ε ferric oxide contained in the core portion 21.

The second shell portion is an oxide film as an antioxidant layer. The second shell portion contains α ferric oxide, aluminum oxide, or silicon oxide. α ferric oxide, for example, includes at least one type of ferric oxide of Fe$_3$O$_4$, Fe$_2$O$_3$, or FeO. In a case where the first shell portion contains α-Fe (the soft magnetic body), a ferric oxide may be obtained by oxidizing α-Fe contained in the first shell portion 22a.

The ε ferric oxide particles include the first shell portion as described above, and thus, it is possible to adjust a coercive force Hc of the entire ε ferric oxide particles (core-shell particles) to a coercive force Hc that is suitable for record while retaining a coercive force Hc of a single body of the core portion, in order to ensure thermal stability. In addition, the ε ferric oxide particles include the second shell portion as described above, and thus, it is possible to suppress a decrease in the properties of the ε ferric oxide particles due to rust or the like that occurs on a particle surface by exposing the ε ferric oxide particles to the air, in a manufacturing step of the magnetic recording medium and before the step. Therefore, it is possible to suppress property degradation of the magnetic recording medium 1.

An average particle size (an average maximum particle size) of the magnetic powder is desirably less than or equal to 22 nm, is more desirably greater than or equal to 8 nm and less than or equal to 22 nm, and is even more desirably greater than or equal to 12 nm and less than or equal to 22 nm.

An average aspect ratio of the magnetic powder is desirably greater than or equal to 1 and less than or equal to 2.5, is more desirably greater than or equal to 1 and less than or equal to 2.1, and is even more desirably greater than or equal to 1 and less than or equal to 1.8. In a case where the average aspect ratio of the magnetic powder is in a range of greater than or equal to 1 and less than or equal to 2.5, it is possible to suppress the aggregation of the magnetic powder, and to suppress resistance that is applied to the magnetic powder at the time of vertically orienting the magnetic powder in a forming step of the magnetic layer 13. Therefore, it is possible to improve vertical orientation properties of the magnetic powder.

An average volume Vave (a particle volume) of the magnetic powder is desirably less than or equal to 2300 nm$^3$, is more desirably less than or equal to 2200 nm$^3$, is more desirably less than or equal to 2100 nm$^3$, is more desirably less than or equal to 1950 nm$^3$, is more desirably less than or equal to 1600 nm$^3$, and is even more desirably less than or equal to 1300 nm$^3$. In a case where the average volume Vave of the magnetic powder is less than or equal to 2300 nm$^3$, it is possible to narrow the half width of the solitary waveform (less than or equal to 195 nm) in the reproduction waveform of the servo signal, and to make the peak of the reproduction waveform of the servo signal sharp. Accordingly, the reading accuracy of the servo signal is improved, and thus, it is possible to increase the number of recording tracks, and to improve the recording density of the data (the details will be described below). Note that, it is excellent that the average volume Vave of the magnetic powder becomes smaller, and thus, a lower limit value of the volume is not particularly limited, but for example, the lower limit value is greater than or equal to 1000 nm$^3$.

The average particle size, the average aspect ratio, and the average volume Vave of the magnetic powder described above are obtained as follows (for example, in a case where the magnetic powder is in the shape of a spherical body as with the ε ferric oxide particles). First, the magnetic recording medium 1 that is a measurement target is worked by a focused ion beam (FIB) method and the like, a thin piece is prepared, and a sectional surface of the thin piece is observed with a TEM. Next, 50 magnetic powders are randomly selected from a TEM picture that is captured, and a long axis length DL and a short axis length DS of each of the magnetic powders are measured. Here, the long axis length DL indicates the maximum distance between two parallel lines drawn from all angles to be in contact with the outline of the magnetic powder (a so-called maximum Feret diameter). On the other hand, the short axis length DS indicates the maximum length of the magnetic powder in a direction orthogonal to a long axis of the magnetic powder.

Subsequently, the long axis lengths DL of 50 magnetic powders that are measured are simply averaged (arithmetically averaged), and thus, an average long axis length DLave is obtained. Then, the average long axis length DLave that is obtained as described above is set to the average particle size of the magnetic powder. In addition, the short axis lengths DS of 50 magnetic powders that are measured are simply averaged (arithmetically averaged), and thus, an average short axis length DSave is obtained. Next, the average aspect ratio (DLave/DSave) of the magnetic powder is obtained from the average long axis length DLave and the average short axis length DSave.

Next, the average volume Vave (the particle volume) of the magnetic powder is obtained from the following expression by using the average long axis length DLave.

$$Vave = \pi/6 \times DLave^3$$

In this description, a case has been described in which the ε ferric oxide particles include the shell portion of the two-layer structure, but the ε ferric oxide particles may include a shell portion of a single layer structure. In this case, the shell portion has a configuration identical to that of the first shell portion. However, as described above, it is desirable that the ε ferric oxide particles include the shell portion of the two-layer structure, from the viewpoint of suppressing the property degradation of the ε ferric oxide particles.

In the above description, a case has been described in which the ε ferric oxide particles have the core-shell structure, but the ε ferric oxide particles may contain an additive instead of the core-shell structure, or may contain the additive along with the core-shell structure. In this case, a part of Fe of the ε ferric oxide particles is substituted with the additive. The ε ferric oxide particles contain the additive, and thus, it is possible to adjust the coercive force Hc of the entire ε ferric oxide particles to the coercive force Hc that is suitable for record, and therefore, it is possible to improve recording easiness. The additive is a metal element other than iron, is desirably a trivalent metal element, is more desirably at least one type of metal element of Al, Ga, or In, and is even more desirably at least one type of metal element of Al or Ga.

Specifically, ε ferric oxide containing the additive is ε-$Fe_{2-x}M_xO_3$ crystals (however, M is a metal element other than iron, is desirably a trivalent metal element, is more desirably at least one type of metal element of Al, Ga, or In, and is even more desirably at least one type of metal element of Al or Ga, and x, for example, is 0<x<1).

The magnetic powder may include a powder nanoparticles containing of hexagonal ferrite (hereinafter, referred to as "hexagonal ferrite particles"). The hexagonal ferrite particles, for example, are in the shape of a hexagonal plate or approximately in the shape of a hexagonal plate. Hexagonal ferrite desirably includes at least one type of metal element of Ba, Sr, Pb, or Ca, and more desirably includes at least one type of metal element of Ba or Sr. Specifically, hexagonal ferrite, for example, may be barium ferrite or strontium ferrite. Barium ferrite may further contain at least one type of metal element of Sr, Pb, or Ca in addition to Ba. Strontium ferrite may further contain at least one type of metal element of Ba, Pb, or Ca in addition to Sr.

More specifically, hexagonal ferrite has an average composition represented by a general formula of $MFe_{12}O_{19}$. However, M, for example, is at least one type of metal of Ba, Sr, Pb, or Ca, and is desirably at least one type of metal of Ba or Sr. M may be a combination of Ba, and one or more types of metals selected from the group consisting of Sr, Pb, and Ca. In addition, M may be a combination of Sr, and one or more types or metals selected from the group consisting of Ba, Pb, and Ca. In the general formula described above, a part of Fe may be substituted with other metal elements.

In a case where the magnetic powder includes a powder of hexagonal ferrite particles, the average particle size of the magnetic powder is desirably less than or equal to 50 nm, is more desirably greater than or equal to 10 nm and less than or equal to 40 nm, and is even more desirably greater than or equal to 15 nm and less than or equal to 30 nm. In a case where the magnetic powder includes a powder of hexagonal ferrite particles, the average aspect ratio of the magnetic powder and the average volume Vave of the magnetic powder are as described above.

Note that, the average particle size, the average aspect ratio, and the average volume Vave of the magnetic powder are obtained as follows (for example, in a case where the magnetic powder is in the shape of a plate as with hexagonal ferrite). First, the magnetic recording medium 1 that is a measurement target is worked by an FIB method and the like, a thin piece is prepared, and a sectional surface of a thin piece is observed with a TEM. Next, 50 magnetic powders that are oriented at an angle of greater than or equal to 75 degrees with respect to the horizontal direction are randomly selected from a TEM picture that is captured, and a maximum plate thickness DA of each of the magnetic powders is measured. Subsequently, the maximum plate thicknesses DA of 50 magnetic powders that are measured are simply averaged (arithmetically averaged), and thus, an average maximum plate thickness DAave is obtained.

Next, the surface of the magnetic layer 13 of the magnetic recording medium 1 is observed with a TEM. Next, 50 magnetic powders are randomly selected from a TEM picture that is captured, and a maximum plate diameter DB of each of the magnetic powders is measured. Here, the maximum plate diameter DB indicates the maximum distance between two parallel lines drawn from all angles to be in contact with the outline of the magnetic powder (a so-called maximum Feret diameter). Subsequently, the maximum plate diameters DB of 50 magnetic powders that are measured are simply averaged (arithmetically averaged), and thus, an average maximum plate diameter DBave is obtained. Then, the average maximum plate diameter DBave that is obtained as described above is set to the average particle size of the magnetic powder. Next, an average aspect ratio (DBave/DAave) of the magnetic powder is obtained from the average maximum plate thickness DAave and the average maximum plate diameter DBave.

Next, the average volume Vave (the particle volume) of the magnetic powder is obtained from the following expression by using the average maximum plate thickness DAave and the average maximum plate diameter DBave.

$$Vave=3\sqrt{3}/8 \times DAave \times DBave^2$$

The magnetic powder may include a powder of nanoparticles containing Co-containing spinel ferrite (hereinafter, referred to as "cobalt ferrite particles"). It is desirable that the cobalt ferrite particles have uniaxial anisotropy. The cobalt ferrite particles, for example, are in the shape of a cube or approximately in the shape of a cube. Co-containing spinel ferrite may further contain at least one type of metal element of Ni, Mn, Al, Cu, or Zn in addition to Co.

Co-containing spinel ferrite, for example, has an average composition represented by Formula (1) described below.

$$Co_xM_yFe_2O_z \quad (1)$$

(However, in Formula (1), M, for example, is at least one type of metal of Ni, Mn, Al, Cu, or Zn. x is a value in a range of 0.4≤x≤1.0. y is a value in a range of 0≤y≤0.3. However, x and y satisfy a relationship of (x+y)≤1.0. z is a value in a range of 3≤z≤4. A part of Fe may be substituted with other metal elements.)

In a case where the magnetic powder include a powder of cobalt ferrite particles, the average particle size of the magnetic powder is desirably less than or equal to 25 nm, and is more desirably less than or equal to 23 nm. In a case where the magnetic powder include the powder of the cobalt ferrite particles, the average aspect ratio of the magnetic powder is obtained by the method as described above, and the average volume Vave of the magnetic powder is obtained by a method described below. In addition, the average aspect ratio of the magnetic powder is also obtained as described above.

Note that, in a case where the magnetic powder is in the shape of a cube as with the cobalt ferrite particles, the average volume Vave (the particle volume) of the magnetic powder can be obtained as follows. First, the surface of the magnetic layer 13 of the magnetic recording medium 1 is observed with a TEM, and then, 50 magnetic powders are randomly selected from a TEM picture that is captured, and a length DC of a side of each of the magnetic powders is measured. Subsequently, the lengths DC of the sides of 50 magnetic powders that are measured are simply averaged (arithmetically averaged), and thus, an average side length DCave is obtained. Next, the average volume Vave (the particle volume) of the magnetic powder is obtained from the following expression by using the average side length DCave.

$$Vave=DCave^3$$

(Binder)

A resin having a structure subjected to a cross-linking reaction, such as a polyurethane-based resin and a vinyl chloride-based resin, is desirable as the binder. However, the binder is not limited thereto, and may be suitably compounded with other resins in accordance with physical properties and the like that are required with respect to the magnetic recording medium 1. The resin to be compounded is not particularly limited insofar as the resin is a resin that is generally used in the general coating type magnetic recording medium 1.

For example, polyvinyl chloride, polyvinyl acetate, a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinyl chloride-vinylidene chloride copolymer, a vinyl chloride-acrylonitrile copolymer, an acrylic ester-acrylonitrile copolymer, an acrylic ester-vinylidene chloride copolymer, a methacrylic ester-vinylidene chloride copolymer, a methacrylic ester-vinyl chloride copolymer, a methacrylic ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene butadiene copolymer, a polyester resin, an amino resin, synthetic rubber, and the like are exemplified.

In addition, examples of a thermosetting resin or an reactive resin include a phenolic resin, an epoxy resin, an urea resin, a melamine resin, an alkyd resin, a silicone resin, a polyamine resin, an urea formaldehyde resin, and the like.

In addition, a polar functional group such as —$SO_3M$, —$OSO_3M$, —COOM, and P=$O(OM)_2$ may be introduced to each binder as described above, in order to improve the dispersibility of the magnetic powder. Here, in the formula, M is a hydrogen atom, or an alkali metal such as lithium, potassium, and sodium.

Further, examples of the polar functional group include a side chain type polar functional group having a terminal group such as —$NR1R2$ and —$NR1R2R3+X^-$, and a main chain type polar functional group such as >$NR1R2^+X^-$. Here, in the formula, R1, R2, and R3 are a hydrogen atom or a hydrocarbon group, and $X^-$ is a halogen element ion of fluorine, chlorine, bromine, iodine, and the like, or an inorganic or organic ion. In addition, examples of the polar functional group include —OH, —SH, —CN, an epoxy group, and the like.

(Lubricant)

It is desirable that the lubricant contains a compound represented by General Formula (1) described below and a compound represented by General Formula (2) described below. The lubricant contains such compounds, and thus, it is possible to particularly reduce a dynamic friction coefficient of the surface of the magnetic layer 13. Therefore, it is possible to further improve traveling properties of the magnetic recording medium 1.

$$CH_3(CH_2)_nCOOH \quad (1)$$

(However, in General Formula (1), n is an integer that is selected from a range of greater than or equal to 14 and less than or equal to 22.)

$$CH_3(CH_2)_pCOO(CH_2)_qCH_3 \quad (2)$$

(However, in General Formula (2), p is an integer that is selected from a range of greater than or equal to 14 and less than or equal to 22, and q is an integer that is selected from a range of greater than or equal to 2 and less than or equal to 5.)

(Additive)

The magnetic layer 13 may further contain aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like, as non-magnetic reinforcement particles.

[Non-Magnetic Layer 12]

The non-magnetic layer 12 is provided between the base material 11 and the magnetic layer 13. The non-magnetic layer 12 contains a non-magnetic powder and a binder. The non-magnetic layer 12 may contain an additive such as conductive particles, a lubricant, a curing agent, and a rust preventive material, as necessary.

The thickness of the non-magnetic layer 12 is desirably greater than or equal to 0.6 μm and less than or equal to 2.0 μm, and is more desirably greater than or equal to 0.8 μm and less than or equal to 1.4 μm. The thickness of the non-magnetic layer 12 can be obtained by the same method as the method of obtaining the thickness of the magnetic layer 13 (for example, a TEM). Note that, the magnification of a TEM image is suitably adjusted in accordance with the thickness of the non-magnetic layer 12.

Note that, as described below, it is advantageous that the thickness of the non-magnetic support body (the base material 11) is the same in order for high capacity since it is possible to increase the entire length of the tape as the thickness of the non-magnetic layer 12 becomes thin, from the viewpoint of storage capacity per one tape cartridge. That is, the thickness of the non-magnetic layer 12 is desirably greater than or equal to 0.6 μm and less than or equal to 1.1 μm, and is more desirably greater than or equal to 0.6 μm and less than or equal to 0.8 μm, from the viewpoint of high capacity of the tape cartridge.

(Non-Magnetic Powder)

The non-magnetic powder, for example, includes at least one type of powder of an inorganic particle powder or an organic particle powder. In addition, the non-magnetic powder may contain Fe-based non-magnetic particles such as hematite (α-$Fe_2O_3$) or goethite (FeO(OH)), and a carbon material such as carbon black. Note that, one type of non-magnetic powder may be independently used, or two or more types of non-magnetic powders may be used by being combined. The inorganic particles, for example, contain a metal, a metal oxide, a metal carbonate, a metal sulfate, a metal nitride, a metal carbide, a metal sulfide, and the like. The non-magnetic powder, for example, is in various shapes of a needle, a spindle, a sphere, a cube, a plate, and the like, but is not limited thereto.

(Binder)

The binder is identical to that of the magnetic layer 13 as described above.

[Back Layer 14]

The back layer 14 contains a non-magnetic powder and a binder. The back layer 14 may contain an additive such as a lubricant, a curing agent, and an antistatic agent, as necessary. Materials identical to the materials that are used in the non-magnetic layer 12 as described above are used as the non-magnetic powder and the binder.

(Non-Magnetic Powder)

An average particle size of the non-magnetic powder is desirably greater than or equal to 10 nm and less than or equal to 150 nm, and is more desirably greater than or equal to 15 nm and less than or equal to 110 nm. The average particle size of the non-magnetic powder is obtained as with the average particle size D of the magnetic powder described above. The non-magnetic powder may include a non-magnetic powder having a particle size distribution of greater than or equal to 2.

An upper limit value of an average thickness of the back layer 14 is desirably less than or equal to 0.6 μm. In a case where the upper limit value of the average thickness of the back layer 14 is less than or equal to 0.6 µm, it is possible to retain the thickness of the non-magnetic layer 12 or the base material 11 to be thick even in a case where an average thickness of the magnetic recording medium 1 is 5.6 µm, and thus, it is possible to retain traveling stability in a recording reproduction device of the magnetic recording medium 1. A lower limit value of the average thickness of the back layer 14 is not particularly limited, and for example, is greater than or equal to 0.2 µm.

The average thickness of the back layer 14 is obtained as follows. First, the magnetic recording medium 1 having a width of ½ inches is prepared, and the magnetic recording medium 1 is cut out to have a length of 250 mm, and thus, a sample is prepared. Next, the thickness of the sample is measured in five or more positions by using laser HOLOGaze manufactured by Mitutoyo Corporation as a measurement device, and measurement values are simply averaged (arithmetically averaged), and thus, an average value $t_T$ [µm] of the magnetic recording medium 1 is calculated. Note that, the measurement position is randomly selected from the sample. Subsequently, the back layer 14 of the sample is removed by a solvent such as methyl ethyl ketone (MEK) or a dilute hydrochloric acid. After that, the thickness of the sample is measured in five or more positions by using laser HOLOGaze described above again, and measurement values are simply averaged (arithmetically averaged), and thus, an average value $t_B$ [µm] of the magnetic recording medium 1 from which the back layer 14 is removed is calculated. Note that, the measurement position is randomly selected from the sample. After that, an average thickness $t_b$ [µm] of the back layer 14 is obtained by the following expression.

$$t_b \text{ [µm]} = t_T \text{ [µm]} - t_B \text{ [µm]}$$

The back layer 14 includes a surface on which a plurality of protrusions are provided. The plurality of protrusions are provided in order to form a plurality of hole portions on the surface of the magnetic layer 13, in a state where the magnetic recording medium 1 is wound into the shape of a roll. The plurality of hole portions, for example, is configured of a plurality of non-magnetic particles protruding from the surface of the back layer 14.

In the description, a case has been described in which the plurality of protrusions provided on the surface of the back layer 14 are transferred onto the surface of the magnetic layer 13, and thus, the plurality of hole portions are formed on the surface of the magnetic layer 13, but a forming method of the plurality of hole portions is not limited thereto. For example, the plurality of hole portions may be formed on the surface of the magnetic layer 13 by adjusting the type of solvent contained in a coating material for forming a magnetic layer, a drying condition of the coating material for forming a magnetic layer, and the like.

[Average Thickness of Magnetic Recording Medium]

An upper limit value of an average thickness (an average total thickness) of the magnetic recording medium 1 is desirably less than or equal to 5.6 µm, is more desirably less than or equal to 5.0 µm, is more desirably less than or equal to 4.6 µm, and is even more desirably less than or equal to 4.4 µm. In a case where the average thickness of the magnetic recording medium 1 is less than or equal to 5.6 µm, it is possible to increase the recording capacity that is capable of performing recording in the cartridge 21, compared to a general magnetic recording medium. A lower limit value of the average thickness of the magnetic recording medium 1 is not particularly limited, and for example, is greater than or equal to 3.5 µm.

The average thickness of the magnetic recording medium 1 is obtained in accordance with the procedure described in the method of obtaining the average thickness of the back layer 14 as described above.

(Coercive Force Hc)

An upper limit value of the coercive force Hc in the longitudinal direction of the magnetic recording medium 1 is desirably less than or equal to 2000 Oe, is more desirably less than or equal to 1900 Oe, and is even more desirably less than or equal to 1800 Oe.

In a case where a lower limit value of the coercive force Hc that is measured in the longitudinal direction of the magnetic recording medium 1 is desirably greater than or equal to 1000 Oe, it is possible to suppress demagnetization due to leakage flux from the recording head.

The coercive force Hc described above is obtained as follows. First, three magnetic recording media 1 are stacked with a double-faced tape, and then, are punched out with a punch of ϕ0.39 mm, and thus, a measurement sample is prepared. Then, an M-H loop of the measurement sample (the entire magnetic recording medium 1) corresponding to the longitudinal direction of the of the magnetic recording medium 1 (a traveling direction of the magnetic recording medium 1) is measured by using a vibrating sample magnetometer (VSM). Next, the coated film (the non-magnetic layer 12, the magnetic layer 13, the back layer 14, and the like) is eliminated by using acetone, ethanol, or the like, and thus, only the base material 11 remains. Then, three base materials 11 that are obtained are stacked with a double-faced tape, and then, are punched with a punch of ϕ6.39 mm, and thus, a sample for background correction (hereinafter, simply referred to as a sample for correction) is obtained. After that, an M-H loop of the sample for correction (the base material 11) corresponding to the longitudinal direction of the base material 11 (the traveling direction of the magnetic recording medium 1) is measured by using a VSM.

The M-H loop of the measurement sample (the entire magnetic recording medium 1) and the M-H loop of the sample for correction (the base material 11) are measured by using a high sensitive vibrating sample magnetometer "VSM-P7-15 type magnetometer" manufactured by TOEI INDUSTRY CO., LTD. In a measurement condition, Measurement Mode: full loop, Maximum Magnetic Field: 15 kOe, Magnetic Field Step: 40 bits, Time Constant of Locking Amp: 0.3 sec, Waiting Time: 1 sec, and MR Average Number: 20 are set.

Two M-H loops are obtained, and then, the M-H loop of the sample for correction (the base material 11) is subtracted from the M-H loop of the measurement sample (the entire magnetic recording medium 1), and thus, background correction is performed, and an M-H loop after the background correction is obtained. The background correction is calculated by using a measurement and analysis program that is attached to "VSM-P7-15 type magnetometer".

The coercive force Hc is obtained from the obtained M-H loop after the background correction. Note that, such calculation is performed by using the measurement and analysis program that is attached to "VSM-P7-15 type magnetometer". Note that, the measurement of the M-H loop described above is performed at 25° C. In addition, "diamagnetic field correction" at the time of measuring the M-H loop in the longitudinal direction of the magnetic recording medium 1 is not performed.

(Orientation Angle (Squareness Ratio))

An orientation angle (the degree of vertical orientation) in the vertical direction (the thickness direction) of the magnetic recording medium 1 is greater than or equal to 65%, is desirably greater than or equal to 70%, is more desirably greater than or equal to 75%, and is more desirably greater than or equal to 80%. In a case where the degree of vertical orientation is greater than or equal to 65%, the vertical orientation properties of the magnetic powder sufficiently increase, and thus, a more excellent SNR can be obtained.

The degree of vertical orientation is obtained as follows. First, three magnetic recording media 1 are stacked with a double-faced tape, and then, are punched out with a punch of ϕ6.39 mm, and thus, a measurement sample is prepared. Then, an M-H loop of the measurement sample (the entire magnetic recording medium 1) corresponding to the vertical direction (the thickness direction) of the magnetic recording medium 1 is measured by using a VSM. Next, the coated film (the non-magnetic layer 12, the magnetic layer 13, the back layer 14, and the like) is eliminated by using acetone, ethanol, or the like, and thus, only the base material 11 remains. Then, three base materials 11 that are obtained are stacked with a double-faced tape, and then, are punched out with a punch of ϕ6.39 mm, and thus, a sample for background correction (hereinafter, simply referred to as a sample for correction) is obtained. After that, an M-H loop of the sample for correction (the base material 11) corresponding to the vertical direction of the base material 11 (the vertical direction of the magnetic recording medium 1) is measured by using a VSM.

The M-H loop of the measurement sample (the entire magnetic recording medium 1) and the M-H loop of the sample for correction (the base material 11) are measured by using a high sensitive vibrating sample magnetometer "VSM-P7-15 type magnetometer" manufactured by TOEI INDUSTRY CO., LTD. In a measurement condition, Measurement Mode: full loop, Maximum Magnetic Field: 15 kOe, Magnetic Field Step: 40 bits, Time Constant of Locking Amp: 0.3 sec, Waiting Time: 1 sec, and MR Average Number: 20 are set.

Two M-H loops are obtained, and then, the M-H loop of the sample for correction (the base material 11) is subtracted from the M-H loop of the measurement sample (the entire magnetic recording medium 1), and thus, background correction is performed, and an M-H loop after the background correction is obtained. The background correction is calculated by using a measurement and analysis program that is attached to "VSM-P7-15 type magnetometer".

Saturated magnetization Ms (emu) and remanent magnetization Mr (emu) of the obtained M-H loop after the background correction are substituted into the following expression, and the degree of vertical orientation (%) is calculated. Note that, the measurement of the M-H loop described above is performed at 25° C. In addition, "diamagnetic field correction" at the time of measuring the M-H loop in the vertical direction of the magnetic recording medium 1 is not performed. Note that, such calculation is performed by using the measurement and analysis program that is attached to "VSM-P7-15 type magnetometer".

Degree of Vertical Orientation (%)=(Mr/Ms)×100

The orientation angle (the degree of longitudinal orientation) in the longitudinal direction (the traveling direction) of the magnetic recording medium 1 is desirably less than or equal to 35%, is more desirably less than or equal to 30%, and is even more desirably less than or equal to 25%. In a case where the degree of longitudinal orientation is less than or equal to 35%, the vertical orientation properties of the magnetic powder sufficiently increase, and thus, a more excellent SNR can be obtained.

The degree of longitudinal orientation is obtained by the same method as that of the degree of vertical orientation, except that the M-H loop is measured in the longitudinal direction (the traveling direction) of the magnetic recording medium 1 and the base material 11.

(Dynamic Friction Coefficient)

In a case where a ratio ($\mu_B/\mu_A$) of a dynamic friction coefficient $\mu_B$ between the surface of the magnetic layer 13 and the magnetic head when the tensile force to be applied to the magnetic recording medium 1 is 0.4 N to a dynamic friction coefficient $\mu_A$ between the surface of the magnetic layer 13 and the magnetic head when a tensile force to be applied to the magnetic recording medium 1 is 1.2 N is desirably greater than or equal to 1.0 and less than or equal to 2.0, it is possible to decrease a change in the friction coefficient due to a variation in the tensile force at the time of traveling, and thus, it is possible to stabilize the traveling of the tape.

A ratio ($\mu_{1000}/\mu_5$) of the 1000th traveling value of $\mu 1000$ to the fifth traveling value of $\mu 5$ of the dynamic friction coefficient $\mu_A$ between the surface of the magnetic layer 13 and the magnetic head when the tensile force to be applied to the magnetic recording medium 1 is 0.6 N is desirably greater than or equal to 1.0 and less than or equal to 2.0, and is more desirably greater than or equal to 1.0 and less than or equal to 1.5. In a case where the ratio ($\mu_B/\mu_A$) is greater than or equal to 1.0 and less than or equal to 2.0, it is possible to decrease a change in the friction coefficient due to traveling of a plurality of times, and thus, it is possible to stabilize the traveling of the tape.

[Data Band and Servo Band]

FIG. 2 is a schematic diagram of the magnetic recording medium 1 seen from an upper side. The magnetic layer 13 includes a plurality of data bands d (data bands d0 to d3) long in the longitudinal direction (the X axis direction) in which the data signal is to be written, and a plurality of servo bands s (servo bands s0 to s4) long in the longitudinal direction in which the servo signal is written, with reference to FIG. 2. The servo bands s are arranged in positions interposing each of the data bands d in the width direction (the Y axis direction).

In the present technology, a ratio of the area of the servo band s to the area of the entire surface of the magnetic layer 13 is typically less than or equal to 4.0%. Note that, the width of the servo band s is typically less than or equal to 95 μm. The ratio of the area of the servo band to the area of the entire surface of the magnetic layer 13, for example, can be measured by developing the magnetic recording medium 1 with a developer such as a fericolloid developer, and then, by observing the developed magnetic recording medium 1 with an optical microscope.

The servo bands s are arranged in the positions interposing the data band d, and thus, the number of servo bands s is one greater than the number of data bands d. In an example illustrated in FIG. 2, a case where the number of data bands d is 4, and the number of servo bands s is 5 is exemplified (in the existing system, such a method is generally adopted).

Note that, the number of data bands d and the number of servo bands s can be suitably changed, and may be increased.

In this case, the number of servo bands s is desirably greater than or equal to 5. In a case where the number of servo bands s is greater than or equal to 5, it is possible to suppress the influence of a reading accuracy of the servo signal due to a dimensional change in the width direction of the magnetic recording medium 1, and to ensure stable recording reproduction properties with few off-tracks.

In addition, the number of data bands d may be set to 8, 12, . . . (that is, 4n (n is an integer of greater than or equal to 2)), and the number of servo bands s may be set to 9, 13, . . . (that is, 4n+1 (n is an integer of greater than or equal to 2)). In this case, it is possible to respond to a change in the number of data bands d and the number of servo bands s without changing the existing system.

The data band d includes a plurality of recording tracks 5 that are long in the longitudinal direction and are arranged in the width direction. The data signal is recorded in the recording track 5 along the recording track 5. Note that, in the present technology, a one-bit length in the longitudinal direction of the data signal that is recorded in the data band d is typically less than or equal to 48 nm. The servo band s includes a servo signal recording pattern 6 of a predetermined pattern in which the servo signal is recorded by a servo signal recording device (not illustrated).

Figure 3:
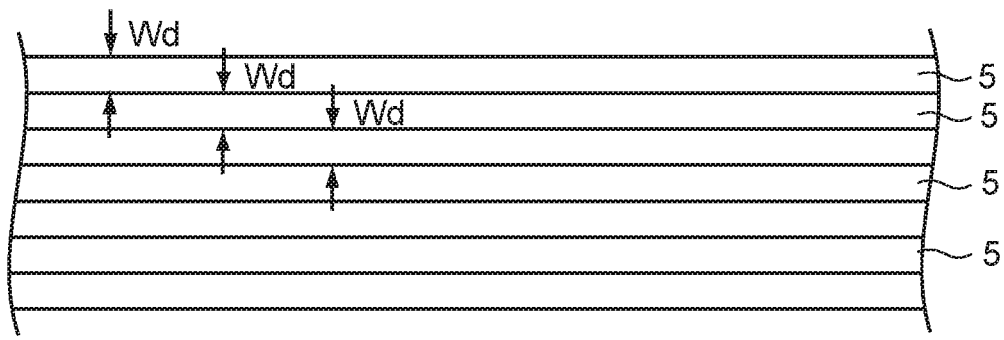
FIG. 3 is an enlarged view illustrating a recording track in a data band.
Figure 3:
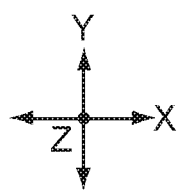

FIG. 3 is an enlarged view illustrating the recording track 5 in the data band d. As illustrated in FIG. 3, the recording track 5 is long in the longitudinal direction, is arranged in the width direction, and has a predetermined recording track width Wd for each track in the width direction. The recording track width Wd is typically less than or equal to 2.0 μm. Note that, such a recording track width Wd, for example, can be measured by developing the magnetic recording medium 1 with a developer such as a fericolloid developer, and then, by observing the developed magnetic recording medium 1 with an optical microscope.

The number of recording tracks 5 included in one data band d, for example, is approximately 1000 to 2000.

Figure 4:
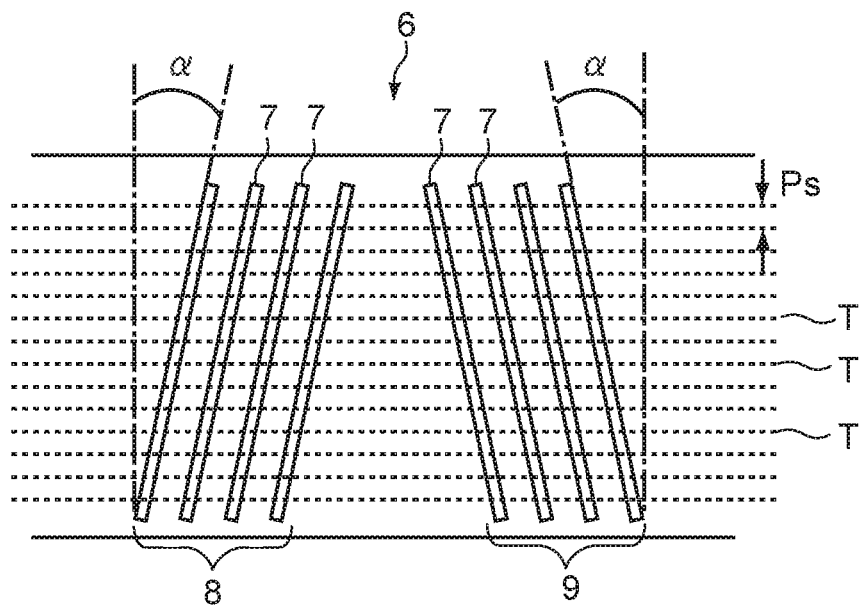
FIG. 4 is an enlarged view illustrating a servo signal recording pattern in a servo band.
Figure 4:
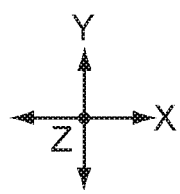

FIG. 4 is an enlarged view illustrating the servo signal recording pattern 6 in the servo band s. As illustrated in FIG. 4, the servo signal recording pattern 6 includes a plurality of stripes 7 that are inclined at a predetermined azimuth angle α with respect to the width direction (the Y axis direction). The plurality of stripes 7 are sorted into a first stripe group 8 that is inclined in a clockwise direction with respect to the width direction (the Y axis direction), and a second stripe group 9 that is inclined in a counterclockwise direction with respect to the width direction. Note that, the shape or the like of the stripe 7, for example, can be measured by developing the magnetic recording medium 1 with a developer such as a fericolloid developer, and then, by observing the developed magnetic recording medium 1 with an optical microscope.

In FIG. 4, a servo trace line T that is a line traced by a servo reading head on the servo signal recording pattern 6 is illustrated by a broken line. The servo trace line T is set along the longitudinal direction (the X axis direction), and is set at a predetermined interval Ps in the width direction.

The number of servo trace lines T per one servo band s, for example, is approximately 30 to 60.

The interval Ps between two adjacent servo trace lines T is identical to the value of the recording track width Wd, and for example, is less than or equal to 2.0 μm. Here, the interval Ps between two adjacent servo trace lines T is a value that defines the recording track width Wd. That is, in a case where the interval Ps between the servo trace lines T is narrowed, the recording track width Wd decreases, and the number of recording tracks 5 included in one data band d increases. As a result thereof, the recording capacity of the data increases (in a case where the interval Ps is widened, the opposite). Therefore, in order to increase the recording capacity, it is necessary to decrease the recording track width Wd, but the interval Ps between the servo trace lines T is also narrowed, and thus, it is difficult to accurately trace the adjacent servo trace lines. Therefore, in this embodiment, as described below, it is also possible to respond the narrowed interval Ps by increasing a reading accuracy of the servo signal recording pattern 6.

<Data Recording Device 20>

Figure 5:
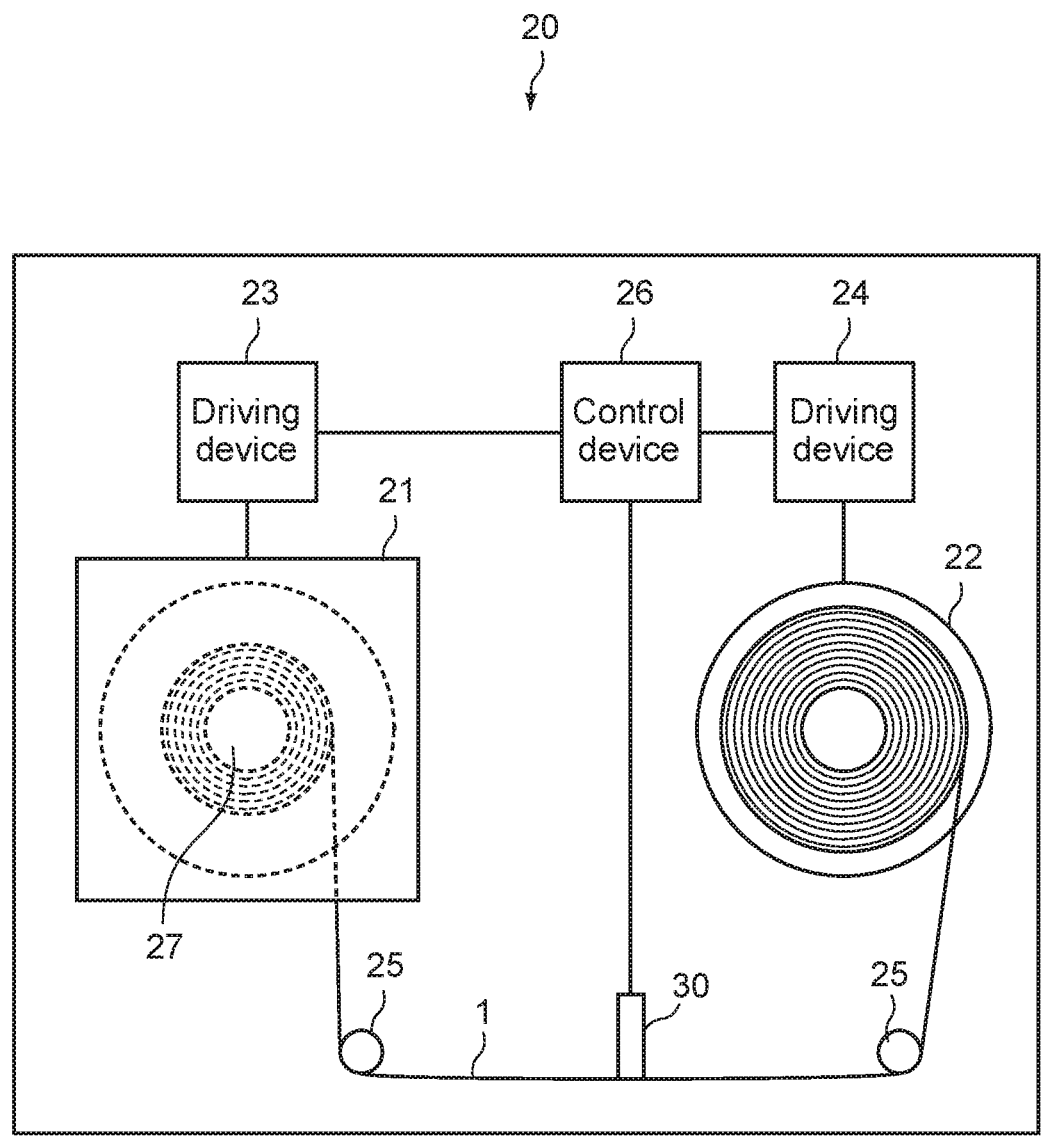
FIG. 5 is a schematic diagram illustrating a data recording device.

Next, a data recording device 20 performing record and reproduction of the data signal with respect to the magnetic recording medium 1 will be described. FIG. 5 is a schematic diagram illustrating the data recording device 20. Note that, in the specification (and the drawings), a coordinate system based on the data recording device 20 indicates an X'Y'Z' coordinate system.

The data recording device 20 is configured to be capable of loading the cartridge 21 containing the magnetic recording medium 1. Note that, here, for the sake of easy description, a case where the data recording device 20 is capable of loading one cartridge 21 will be described, but the data recording device 20 may be configured to be capable of loading a plurality of cartridges 21.

As illustrated in FIG. 5, the data recording device 20 includes a spindle 27, a reel 22, a spindle driving device 23, a reel driving device 24, a plurality of guide rollers 25, a head unit 30, and a control device 26.

The spindle 27 is configured to be capable of loading the cartridge 21. The cartridge 21 is based on a linear tape open (LTO) standard, and contains the wound magnetic recording medium 1 in a case to be rotatable. The reel 22 is configured to be capable of fixing a tip end side of the magnetic recording medium 1 that is drawn from the cartridge 21.

The spindle driving device 23 rotates the spindle 27 in accordance with a command from the control device 26. The reel driving device 24 rotates the reel 22 in accordance with the command from the control device 26. When the record/reproduction of the data signal is performed with respect to the magnetic recording medium 1, the spindle 27 and the reel 22 are rotated by the spindle driving device 23 and the reel driving device 24, and the magnetic recording medium 1 travels. The guide roller 25 is a roller for guiding the traveling of the magnetic recording medium 1.

The control device 26, for example, includes a control unit, a storage unit, a communication unit, and the like. The control unit, for example, includes a central processing unit (CPU) and the like, and comprehensively controls each unit of the data recording device 20, in accordance with a program stored in the storage unit.

The storage unit includes a non-volatile memory in which various data items or various programs are recorded, and a volatile memory that is used as a working area of the control unit. The various programs described above may be read from a portable recording medium such as an optical disk and a semiconductor memory, or may be downloaded from a server device on a network. The communication unit is configured to be capable of performing communication with respect to other devices such as a personal computer (PC) and a server device.

The head unit 30 is configured to be capable of recording the data signal in the magnetic recording medium 1, in accordance with the command from the control device 26. In addition, the head unit 30 is configured to be capable of reproducing the data that is written in the magnetic recording medium 1, in accordance with the command from the control device 26.

Figure 6:
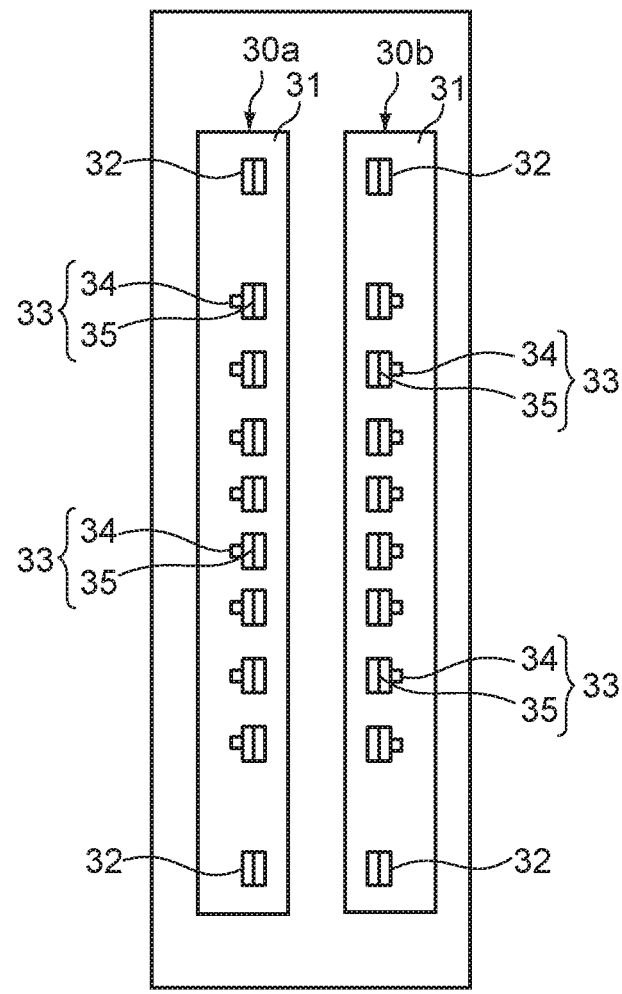
FIG. 6 is a diagram of a head unit seen from a lower side.
Figure 6:
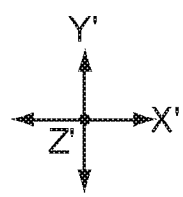

FIG. 6 is a diagram of the head unit 30 seen from a lower side. As illustrated in FIG. 6, the head unit 30 includes a first head unit 30*a* and a second head unit 30*b*. The first head unit 30*a* and the second head unit 30*b* are configured to be symmetric in an X' axis direction (the traveling direction of the magnetic recording medium 1). The first head unit 30*a* and the second head unit 30*b* are configured to be capable of being moved in the width direction (a Y' axis direction).

The first head unit 30*a* is a head that is used when the magnetic recording medium 1 travels in a forward direction (a direction flowing from the cartridge 21 side to the device 20 side). On the other hand, the second head unit 30*b* is a head that is used when the magnetic recording medium 1 travels in a reverse direction (a direction flowing from the device 20 side to the cartridge 21 side).

The first head unit 30*a* and the second head unit 30*b* basically have the same configuration, and thus, the first head unit 30*a* will be representatively described.

The first head unit 30*a* includes a unit main body 31, two servo reading heads 32, and a plurality of data writing/reading heads 33.

The servo reading head 32 is configured to be capable of reproducing a servo signal 6 by reading magnetic flux that is generated from magnetic information recorded in the magnetic recording medium 1 (the servo band s) with a magneto resistive (MR) element or the like. That is, the servo signal recording pattern 6 that is recorded on the servo band s is read by the servo reading head 32, and thus, the servo signal is reproduced. The servo reading heads 32 are respectively provided on both end sides of the unit main body 31 in the width direction (the Y' axis direction). An interval between two servo reading heads 32 in the width direction (the Y' axis direction) is approximately identical to a distance between the adjacent servo bands s of the magnetic recording medium 1.

The data writing/reading heads 33 are arranged at an equal interval along the width direction (the Y axis direction). In addition, the data writing/reading head 33 is arranged in a position interposed between two servo reading heads 32. The number of data writing/reading heads 33, for example, is approximately 20 to 40, but is not particularly limited.

The data writing/reading head 33 includes a data writing head 34 and a data reading head 35. The data writing head 34 is configured to be capable of recording the data signal in the magnetic recording medium 1 in accordance with a magnetic field that is generated from a magnetic gap. In addition, the data reading head 35 is configured to be capable of reproducing the data signal by reading a magnetic field that is generated from the magnetic information recorded in the magnetic recording medium 1 (the data band d) with a magneto resistive (MR) element or the like.

In the first head unit 30*a*, the data writing head 34 is arranged on a left side of the data reading head 35 (on an upstream side in a case where the magnetic recording medium 1 flows in the forward direction). On the other hand, in the second head unit 30*b*, the data writing head 34 is arranged on a right side of the data reading head 35 (on an upstream side in a case where the magnetic recording medium 1 flows in the reverse direction). Note that, the data reading head 35 is capable of reproducing the data signal immediately after the data writing head 34 writes the data signal in the magnetic recording medium 1.

Figure 7:
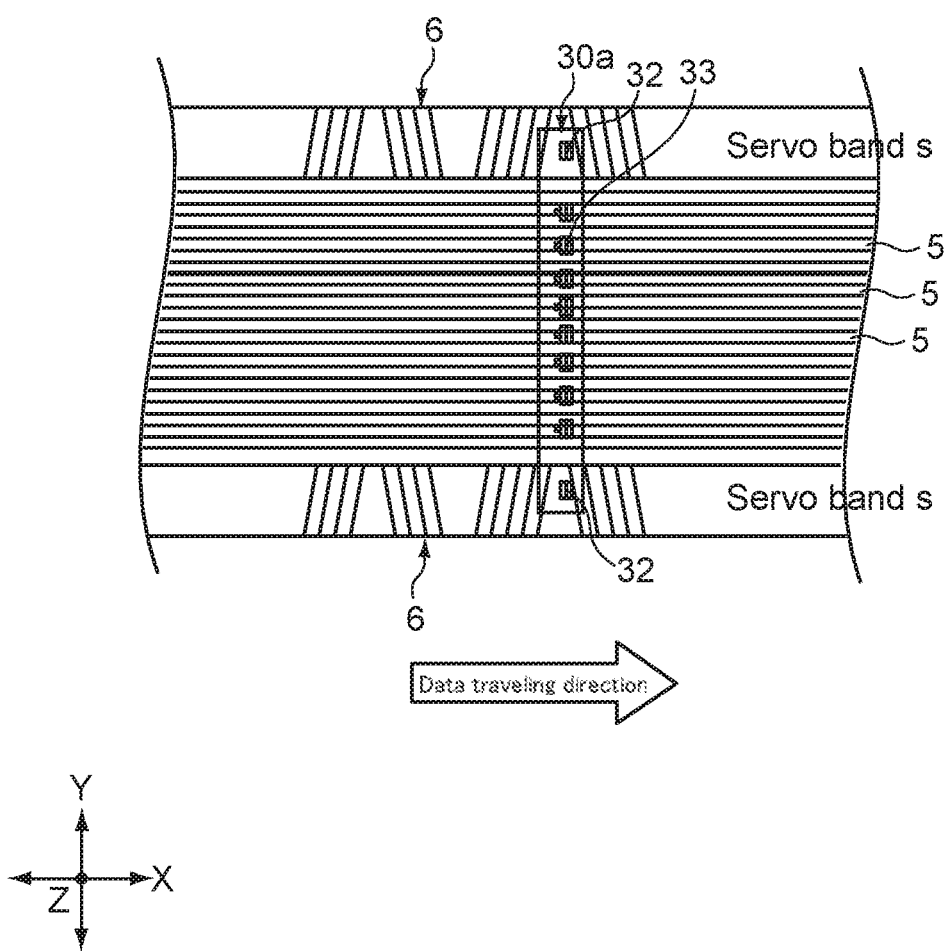
FIG. 7 is a diagram illustrating a state in which a first head unit performs record/reproduction of a data signal.

FIG. 7 is a diagram illustrating a state when the first head unit 30*a* performs record/reproduction of the data signal. Note that, in an example illustrated in FIG. 7, a state is illustrated in which the magnetic recording medium 1 travels in the forward direction (the direction flowing from the cartridge 21 side to the device 20 side).

As illustrated in FIG. 7, when the first head unit 30*a* performs record/reproduction of the data signal, one servo reading head 32 in two servo reading heads 32 is positioned on one servo band s in two adjacent servo bands s, and reads the servo signal on the servo band s.

In addition, the other servo reading head 32 in two servo reading heads 32 is positioned on the other servo band s in two adjacent servo bands s, and reads the servo signal on the servo band s.

In addition, at this time, the control device 26 determines whether or not the servo reading head 32 accurately traces on the target servo trace line T (refer to FIG. 4), on the basis of the reproduction waveform of the servo signal recording pattern.

The principle will be described. As illustrated in FIG. 4, in the first stripe group 8 and the second stripe group 9 of the servo signal recording pattern 6, inclination directions with respect to the width direction (the Y axis direction) are opposite to each other. For this reason, in the servo trace line T on an upper side, a distance between the first stripe group 8 and the second stripe group 9 in the longitudinal direction (the X axis direction) is relatively narrowed. On the other hand, in the servo trace line T on a lower side, the direction between the first stripe group 8 and the second stripe group 9 in the longitudinal direction (the X axis direction) is relatively widened.

For this reason, in the case of obtaining a difference between a time when a reproduction waveform of the first stripe group 8 is detected and a time when a reproduction waveform of the second stripe group 9 is detected, it is known in which position the servo reading head 32 is currently positioned with respect to the magnetic recording medium 1 in the width direction (the Y axis direction).

Accordingly, the control device 26 is capable of determining whether or not the servo reading head 32 accurately traces on the target servo trace line T, on the basis of the reproduction waveform of the servo signal. Then, in a case where the servo reading head 32 does not accurately trace on the target servo trace line T, the control device 26 moves the head unit 30 in the width direction (the Y' axis direction), and adjusts the position of the head unit 30.

Returning to FIG. 7, the data writing/reading head 33 records the data signal in the recording track 5 along the recording track 5 while adjusting the position in the width direction (in a case where the position is shifted).

Here, in a case where the entire magnetic recording medium 1 is drawn from the cartridge 21, the magnetic recording medium 1 travels in the reverse direction (the direction flowing from the device 20 side to the cartridge 21 side). At this time, the second head unit 30*b* is used as the head unit 30.

In addition, at this time, a servo trace line T that is adjacent to the previous servo trace line T is used as the servo trace line T. In this case, the head unit 30 is moved in the width direction (the Y' axis direction) by the interval Ps of the servo trace line T (=Recording Track Width Wd).

In addition, In this case, the data signal is recorded in the recording track 5 adjacent to the recording track 5 in which the previous data signal is recorded.

As described above, the data signal is recorded in the recording track 5 while the magnetic recording medium 1 is reciprocated in accordance with a change in the traveling direction between the forward direction and the reverse direction.

Here, for example, a case is assumed in which the number of servo trace lines T is 50, and the number of data writing/reading heads 33 included in the first head unit 30*a*

(or the second head units 30b) is 32. In this case, the number of recording tracks 5 included in one data band d is 1600 by 50×32, and it is necessary to reciprocate the magnetic recording medium 1 25 times in order to record the data signal in all of the recording tracks 5.

<Basic Concept of Present Technology>

Next, the basic concept of the present technology will be described. In the present technology, it is focused on the half width (PW50) of the solitary waveform in the reproduction waveform of the servo signal. First, the half width of the solitary waveform will be described.

Figure 8:
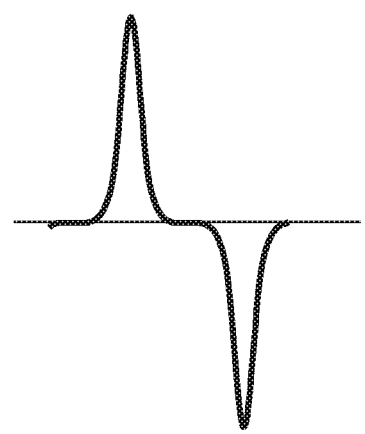
FIG. 8 is a diagram illustrating a reproduction waveform when one stripe in the servo signal recording pattern is read.

FIG. 8 is a diagram illustrating a reproduction waveform when one stripe 7 in the servo signal recording pattern 6 is read. As illustrated in FIG. 8, the reproduction waveform when one stripe 7 is read protrudes to a plus side and a minus side. The solitary waveform basically indicates any waveform. In FIG. 8, a vertical axis is an intensity (arbitrary unit), and a horizontal axis is a length along the traveling direction (the same applies to FIG. 9).

It is the half thereof.

Figure 9:
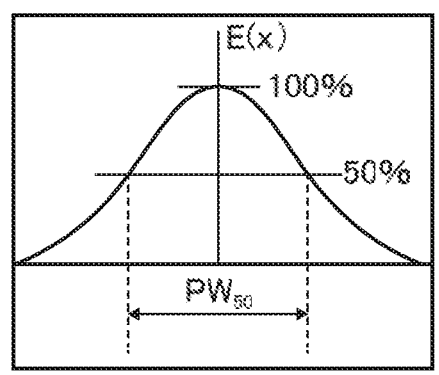
FIG. 9 is a diagram for illustrating a half width in a solitary waveform.

FIG. 9 is a diagram for illustrating the half width of the solitary waveform. As illustrated in FIG. 9, the half width is the width of a waveform at a height that is the half (50%) of the maximum value (100%) of the reproduction waveform of the servo signal.

The half width is a value indicating the sharpness of a peak in the reproduction waveform of the servo signal. That is, the sharpness of the peak in the reproduction waveform increases as the half width becomes narrow, and on the contrary, the sharpness of the peak in the reproduction waveform decreases as the half width becomes wider.

Figure 10:
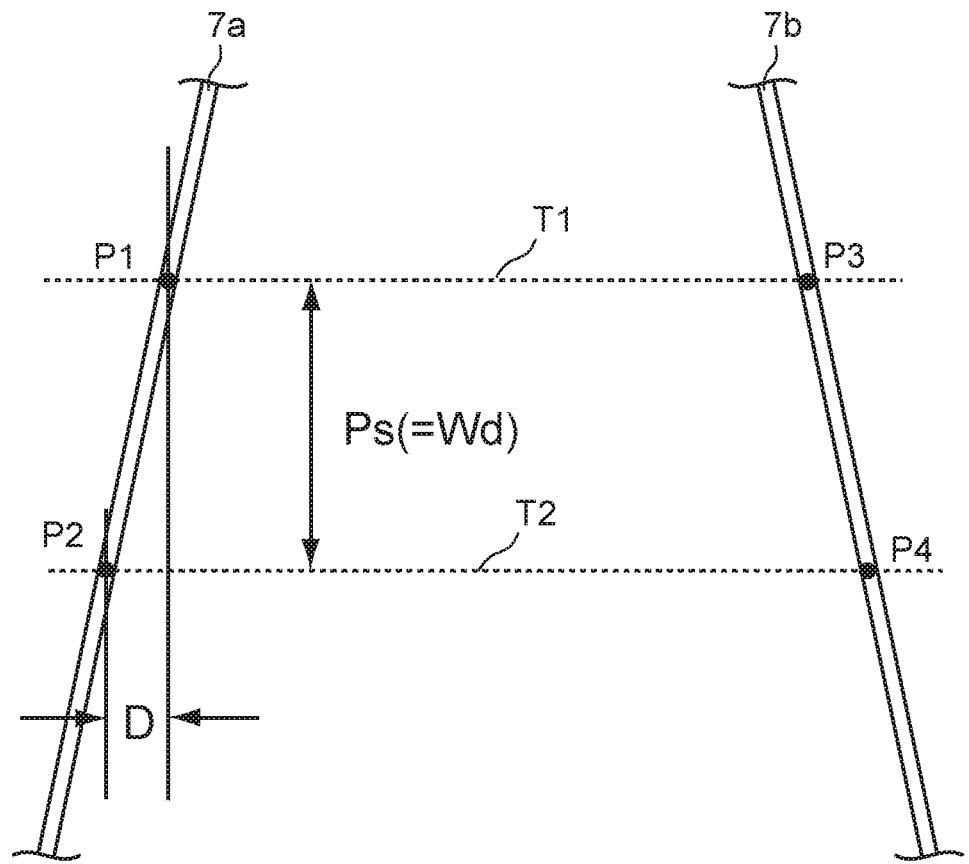
FIG. 10 is a diagram for illustrating a basic concept of the present technology, and is a diagram illustrating two stripes in the servo signal recording pattern.

FIG. 10 is a diagram for illustrating the basic concept of the present technology, and is a diagram illustrating two stripes 7 in the servo signal recording pattern 6.

An arbitrary stripe 7 in a plurality of stripes 7 included in the first stripe group 8 of the servo signal recording pattern 6 is set to a first stripe 7a, with reference to FIG. 10. In addition, an arbitrary stripe 7 in a plurality of stripes 7 included in the second stripe group 9 of the servo signal recording pattern 6 is set to a second stripe 7b.

In addition, an arbitrary servo trace line T in a plurality of servo trace lines T is set to a first servo trace line T1. In addition, a servo trace line T that is adjacent to the first servo trace line T1 is set to a second servo trace line T2.

In addition, an intersection point between the first stripe 7a and the first servo trace line T1 is set to P1. Note that, in P1, an arbitrary point on the first stripe 7a may be set to P1.

In addition, an intersection point between the first stripe 7a and the second servo trace line T2 is set to P2. Note that, in P2, a point on the first stripe 7a that is in a position separated from P1 by the interval Ps (that is, the recording track width Wd) in the width direction (the Y axis direction) may be set to P2.

In addition, a distance between P1 and P2 in the longitudinal direction (the X axis direction) is set to a distance D.

In addition, an intersection point between the second stripe 7b and the first servo trace line T1 is set to P3, and an intersection point between the second stripe 7b and the second servo trace line T2 is set to P4.

When the first servo trace line T1 is traced, it is necessary to determine a difference between a time when the reproduction waveform is detected at P1 and a time when the reproduction waveform is detected at P3. The difference is set to a first period.

Similarly, when the second trace line T is traced, it is necessary to determine a difference between a time when the reproduction waveform is detected at P2 and a time when the reproduction waveform is detected at P4. The difference is set to a second period.

Next, a difference between the first period and the second period will be considered. Here, in a case where the interval Ps of the servo trace line T, and the recording track width Wd are 1.56 μm, an azimuth angle α is 12 degrees. In this case, the distance D is 0.33 μm by 1.56×tan 12°. A difference between a distance between P1 and P3 and a distance between P2 and P4 is twice the distance D, and thus, is 0.66 μm.

At this time, a traveling speed of the magnetic recording medium 1 is 5 m/s, the result is 0.66/5000000, and thus, is 0.13 μs. This is the difference between the first period and the second period.

That is, in order to accurately trace the first servo trace line T1 and the second servo trace line T2, it is necessary to accurately determine a small difference of 0.13 μs (in a case where it is not possible to accurately determine the difference, the data signal is recorded in the adjacent recording track 5).

However, in a case where the sharpness of the peak in the reproduction waveform (refer to FIG. 8) of the servo signal decreases, it is not possible to accurately determine such a small difference. In particular, in a case where the recording track width Wd decreases, and the interval Ps of the servo trace line T decreases, in order to increase the number of recording tracks 5, the distance D is further narrowed, and the difference between the first period and the second period further decreases.

Therefore, in the present technology, the degree of vertical orientation of the magnetic layer 13 is set to be greater than or equal to a constant value, and thus, the half width of the solitary waveform in the reproduction waveform of the servo signal is set to be less than or equal to the constant value. Accordingly, the peak in the reproduction waveform of the servo signal becomes sharp.

More specifically, the degree of vertical orientation of the magnetic layer 13 is set to be greater than or equal to 65%, and thus, the half width of the solitary waveform can be set to be less than or equal to 195 nm. Accordingly, it is possible to make the peak in the reproduction waveform of the servo signal sharp (refer to each example described below) to the extent that the small difference (for example, 0.13 μs) as described above can be identified.

VARIOUS EXAMPLES AND VARIOUS COMPARATIVE EXAMPLES

Next, various examples and various comparative examples of the present technology will be described. FIG. 11 is a diagram illustrating various examples and various comparative examples.

First, the magnetic recording medium 1 according to a first example was prepared as a reference magnetic recording medium 1, and in the other examples and the other comparative examples, various values such as the degree of vertical orientation were changed with respect to the first example.

As illustrated in FIG. 11, in the first example, the degree of vertical orientation of the magnetic layer 13 was set to 65%, and the degree of longitudinal orientation of the magnetic layer 13 was set to 35%. In addition, in the first example, a ratio (refer to FIG. 10) of the distance D to the recording track width Wd (the interval Ps of the servo trace line T) was set to 21.3%. Note that, the ratio is in a relationship with the azimuth angle α (refer to FIG. 4), and is identical to a value of tan α indicated in %. Note that, in the first example, the azimuth angle α was set to 12°.

In addition, in the first example, the distance D (refer to FIG. 10) was set to 0.12 µm, and the recording track width Wd (the interval Ps of the servo trace line T) was set to 0.56 µm. In addition, in the first example, hexagonal plate-like barium ferrite was used as the magnetic powder contained in the magnetic layer 13.

In addition, in the first example, the half width of the solitary waveform in the reproduction waveform of the servo signal was 180 nm. In addition, in the first example, the magnetic powder contained in the magnetic layer 13 was in the shape of a plate, and an aspect ratio of the magnetic powder was set to 2.8. In addition, the particle volume (the average volume Vave) of the magnetic powder was set to 1950 nm³. In addition, the thickness of the magnetic layer 13 was set to 80 nm.

Note that, the half width of the solitary waveform, for example, can be obtained as follows. First, for example, a plurality of solitary waveforms are subjected to averaging (synchronous addition averaging) by using a digital storage oscilloscope, in a condition of Sampling: 500 Ms/s (2 nsec/point) and Number of Samplings: 50000 points. Then, the half width of the solitary waveform is calculated from the obtained solitary reproduction waveform. Note that, in the synchronous addition, positioning is performed in a peak position of the waveform.

In addition, a tunnel magneto resistive (TMR) head including a TMR element is used as the servo reading head 32 reading the servo signal. A reproduction track width (the Y' axis direction: the width direction of the magnetic recording medium) of the servo signal in the TMR head is set to 48 nm. Here, spacing between two shields (the X' axis direction: the transport direction of the magnetic recording medium) the used TMR head is set to 40 nm, and a bias current in the TMR head is set to be less than 2 mA. In addition, a transport speed of the magnetic recording medium 1 is set to 2 m/s.

In a second example, the degree of vertical orientation of the magnetic layer 13 was increased compared to the first example, and was set to 66%. In addition, the degree of longitudinal orientation of the magnetic layer 13 was decreased, and was set to 31%. In the second example, the degree of vertical orientation of the magnetic layer 13 was increased (the degree of longitudinal orientation of the magnetic layer 13 was decreased) compared to the first example, and thus, the half width of the solitary waveform was narrower than that of the first example, and was set to 160 nm. Note that, the other points are identical to those of the first example.

In a third example, the degree of vertical orientation of the magnetic layer 13 was further compared to the second example, and was set to 70%. In addition, the degree of longitudinal orientation of the magnetic layer 13 was further decreased, and was set to 29%. In the third example, the degree of vertical orientation of the magnetic layer 13 was further increased (the degree of longitudinal orientation of the magnetic layer 13 was further decreased) compared to the second example, and thus, the half width of the solitary waveform was narrower than that of the second example, and was set to 150 nm. Note that, the other points are identical to those of the first example.

In a fourth example, the degree of vertical orientation of the magnetic layer 13 was further increased compared to the third example, and was set to 71%. In addition, the degree of longitudinal orientation of the magnetic layer 13 was further decreased, and was set to 25%. In the fourth example, the degree of vertical orientation of the magnetic layer 13 was further increased (the degree of longitudinal orientation of the magnetic layer 13 was further decreased) compared to the third example, and thus, the half width of the solitary waveform was narrower than that of the third example, and was set to 140 nm. Note that, the other points are identical to those of the first example.

In a fifth example, the degree of vertical orientation of the magnetic layer 13 was set to 66%, and the degree of longitudinal orientation of the magnetic layer 13 was set to 31%. Note that, the degree of vertical orientation and the degree of longitudinal orientation in the fifth example to the fourteenth example are identical to those of the second example.

In addition, in the fifth example, the azimuth angle α (refer to FIG. 4) of the servo signal recording pattern 6 is different from that of the first example to the fourth example, and the azimuth angle α is set to 24 degrees. In such a relationship, in the fifth example, the distance D (refer to FIG. 10) is different from that of the first example to the fourth example, and is set to 0.17 µm. In addition, in the fifth embodiment, the ratio (refer to FIG. 10) of the distance D to the recording track width Wd (the interval Ps of the servo trace line T) is different from that of the first example to the fourth example, and is set to 44.5%.

In the fifth example, the degree of vertical orientation and the degree of longitudinal orientation were identical to those of the second example, but in a relationship where the azimuth angle α of the servo signal recording pattern 6 was increased, the half width of the solitary waveform was increased compared to the second example, and was set to 180 nm. Note that, the other points are identical to those of the first example.

In a sixth example, the degree of vertical orientation of the magnetic layer 13 was set to 66%, and the degree of longitudinal orientation of the magnetic layer 13 was set to 31%. In addition, in the sixth example, the azimuth angle α (refer to FIG. 4) of the servo signal recording pattern 6 is different from that of the first example to the fifth example, and the azimuth angle α is set to 18 degrees.

In such a relationship, in the sixth example, the ratio (refer to FIG. 10) of the distance D to the recording track width Wd (the interval Ps of the servo trace line T) is different from that of the first example to the fifth example, and is set to 32.5%.

In addition, in the sixth example, the recording track width Wd (the interval Ps of the servo trace line T) was also different from that of the first example to the fifth example, and was set to 0.52 µm. In addition, in the sixth example, the distance D (refer to FIG. 10) as set to 0.17 µm. Then, in the sixth example, the half width of the solitary waveform was 170 µm.

In a seventh example to a tenth example, the recording track width Wd (the interval Ps of the servo trace line T) is changed by using the same magnetic recording medium 1 as the magnetic recording medium 1 used in the second example. Specifically, in the seventh example, the recording track width Wd (the interval Ps of the servo trace line T) was set to 2.91 µm, and the distance D was set to 0.62 µm.

In addition, in the eighth example, the recording track width Wd (the interval Ps of the servo trace line T) was set to 1.55 µm, and the distance D was set to 0.33 µm. In addition, in the ninth example, the recording track width Wd (the interval Ps of the servo trace line T) was set to 0.56 µm, and the distance D was set to 0.12 µm. In addition, in the tenth example, the recording track width Wd (the interval Ps of the servo trace line T) was set to 0.38 µm, and the distance D was set to 0.08 µm.

Note that, even in a case where the recording track width Wd (the interval Ps of the servo trace line T) is changed, the half width of the solitary waveform is not changed insofar as the degree of vertical orientation, the azimuth angle α, and the like are not changed (the half width in the seventh example to the tenth example, is 160 nm, as with the second example).

In an eleventh example to a fourteenth example, the component of the magnetic powder contained in the magnetic layer 13 is different from that of the second example, but the other points are identical to those of the second example.

In the eleventh example, hexagonal plate-like strontium ferrite was used as the magnetic powder. The aspect ratio of the magnetic powder was 3. In the twelfth example, spherical ε ferric oxide particles were used as the magnetic powder. The aspect ratio of the magnetic powder was 1.1.

In the thirteenth example, spherical gallium ferrite was used as the magnetic powder. The aspect ratio of the magnetic powder was 1. In the fourteenth example, cubical cobalt-containing ferrite was used as the magnetic powder. The aspect ratio of the magnetic powder was 1.7.

In the eleventh example to the fourteenth example (and the second example), the components of the magnetic powder contained in the magnetic layer 13 are different from each other, but the degree of vertical orientation (66%), the azimuth angle (12°), and the like are the same, and thus, the half width of the solitary waveform is set to the same value (160 nm).

In a first comparative example and a second comparative example, the degree of vertical orientation is low (55% and 61%), and the degree of longitudinal orientation is high (46% and 40%), and thus, the half width of the solitary waveform is wide, and is set to 220 nm and 200 nm. In the first comparative example and the second comparative example, the peak in the reproduction waveform of the servo signal is not sharp, and thus, it is considered that when the difference between the first period and the second period is small (the distance D is small), it is not possible to accurately determine the difference (or the distance D).

In contrast, in the first example to the eighteenth example, the degree of vertical orientation is high (greater than or equal to 65%), and the degree of longitudinal orientation is low (less than or equal to 35%), and thus, the half width of the solitary waveform is narrowed (less than or equal to 195 nm). Accordingly, in the first example to the eighteenth example, the peak in the reproduction waveform of the servo signal is sharp, and thus, even in a case where the difference between the first period and the second period is small (even in a case where the distance D is small), it is possible to accurately determine the difference (or the distance D).

On the other hand, in a third comparative example, the degree of vertical orientation is high (66%), and the degree of longitudinal orientation is low (31%), and thus, the half width of the solitary waveform is narrow, and is set to 160 nm. However, in the third comparative example, the recording track width Wd (the interval Ps of the servo trace line T) is excessively narrow, the value of the distance D is excessively small, and the difference between the first period and the second period is excessively small.

For this reason, in the third comparative example, the half width of the solitary waveform is set to a suitable value, but the difference between the first period and the second period is excessively small (the distance D is excessively small), and thus, it is not possible to determine the difference (or the distance D), and the system may be broken down.

For this reason, typically, the value of the distance D is set to be greater than or equal to 0.08 µm.

FIG. 12 is a diagram illustrating other various examples and other various comparative examples.

In a fifteenth example, the degree of vertical orientation of the magnetic layer 13 was further increased compared to the fourth example, and was set to 75%. In addition, the degree of longitudinal orientation of the magnetic layer 13 was further decreased, and was set to 23%. Note that, the other points are identical to those of the fourth example (the first example). In the fifteenth example, the degree of vertical orientation of the magnetic layer 13 was further increased (the degree of longitudinal orientation of the magnetic layer 13 was further decreased) compared to the fourth example, and thus, the half width of the solitary waveform was narrower than that of the fourth example, and was set to 138 nm.

In a sixteenth example, the degree of vertical orientation of the magnetic layer 13 was further increased compared to the fifteenth example, and was set to 80%. In addition, the degree of longitudinal orientation of the magnetic layer 13 was further decreased, and was set to 21%. Note that, the other points are identical to those of the nineteenth example (the first example). In a twentieth example, the degree of vertical orientation of the magnetic layer 13 was further increased (the degree of longitudinal orientation of the magnetic layer 13 was further decreased) compared to the fifteenth example, and thus, the half width of the solitary waveform was narrower than that of the fifteenth example, and was set to 130 nm.

In a seventeenth example, the degree of vertical orientation of the magnetic layer 13 was further increased compared to the sixteenth example, and was set to 85%. In addition, the degree of longitudinal orientation of the magnetic layer 13 was further decreased, and was set to 18%. Note that, the other points are identical to those of the sixteenth example (the first example). In the seventeenth example, the degree of vertical orientation of the magnetic layer 13 was further increased (the degree of longitudinal orientation of the magnetic layer 13 was further decreased) compared to the sixteenth example, and thus, the half width of the solitary waveform was narrower than that of the sixteenth example, and was set to 119 nm.

In an eighteenth example, the particle volume (the average volume Vave) of the magnetic powder was decreased compared to the first example, and was set to 1600 nm$^3$. Note that, the other points are identical to those of the first example. In the eighteenth example, the particle volume was decreased compared to the first example, and thus, the half width of the solitary waveform was narrower than that of the first example, and was set to 130 nm. Note that, the half width of the solitary waveform is narrowed in a case where the particle volume of the magnetic powder decreases since a magnetization transition region is narrowed.

In a nineteenth example, the particle volume (the average volume Vave) of the magnetic powder was further decreased compared to the eighteenth example, and was set to 1300 nm$^3$. Note that, the other points are identical to those of the eighteenth example (the first example). In the nineteenth example, the particle volume was further decreased compared to the eighteenth example, and thus, the half width of the solitary waveform was narrower than that of the eighteenth example, and was set to 125 nm.

In a twentieth example, as with the fifteenth example, the degree of vertical orientation of the magnetic layer 13 was set to 75%, and the degree of longitudinal orientation of the magnetic layer 13 was set to 23%. On the other hand, in the twentieth example, the thickness of the magnetic layer 13 was decreased compared to fifteenth example (compared to the first example), and was set to 60 nm. Note that, the other points are identical to those of the fifteenth example (the first example). In the twentieth example, the thickness of the magnetic layer 13 was decreased compared to the fifteenth example, and thus, the half width of the solitary waveform was narrower than that of the fifteenth example, and was set to 120 nm.

In a twenty-first example, the degree of vertical orientation of the magnetic layer 13 was further increased compared to the twentieth example, and was set to 80%. In addition, the degree of longitudinal orientation of the magnetic layer 13 was further decreased compared to the twentieth example, and was set to 21%. Further, in the twenty-first example, the thickness of the magnetic layer 13 was further decreased compared to the twentieth example, and was set to 40 nm. Note that, the other points are identical to those of the twentieth example (the first example).

Here, in the twenty-first example, the conditions are identical to those of the sixteenth example, except that the thickness of the magnetic layer 13 was decreased to 40 nm from 80 nm. In the twenty-first example, the thickness of the magnetic layer 13 is decreased compared to the sixteenth example, and thus, the half width of the solitary waveform is narrowed, and is set to 100 nm.

Note that, it is considered that it is possible to make the peak in the reproduction waveform sharp by decreasing the value (less than or equal to 195 nm) of the half width of the solitary waveform in the reproduction waveform of the servo signal, insofar as the thickness of the magnetic layer 13 is less than or equal to 90 nm.

In a fourth comparative example, the particle volume of the magnetic powder was increased compared to the first example, and was set to 2500 nm$^3$. Note that, the other points are identical to those of the first example. In the fourth comparative example, the particle volume of the magnetic powder was increased compared to the first example, and thus, the half width of the solitary waveform was wider than that of the first example, and was set to 210 nm. The value (210 nm) of the half width increases, and thus, does not fall within a suitable range (less than or equal to 195 nm).

In a fifth comparative example, the particle volume of the magnetic powder was further increased compared to the fourth comparative example, and was set to 2800 nm$^3$. Note that, the other points are identical to those of the fourth comparative example (the first example). In the fifth comparative example, the particle volume of the magnetic powder was further increased compared to the fourth comparative example, and thus, the half width of the solitary waveform was wider than that of the fourth comparative example, and was set to 220 nm. The value (220 nm) of the half width increases, and thus, does not fall within a suitable range (less than or equal to 195 nm).

Note that, it is considered that it is possible to make the peak in the reproduction waveform sharp by decreasing the value (less than or equal to 195 nm) of the half width of the solitary waveform in the reproduction waveform of the servo signal, insofar as the particle volume of the magnetic powder is less than or equal to 2300 nm$^3$.

<Function and Others>

As described above, in the present technology, the degree of vertical orientation of the magnetic layer 13 is set to be greater than or equal to 65%, and the half width of the solitary waveform in the reproduction waveform of the servo signal is set to be less than or equal to 195 nm (refer to the first example to the twenty-first example). Accordingly, the peak in the reproduction waveform of the servo signal becomes sharp, and even in a case where the difference between the first period and the second period is small (even in a case where the distance D is small), it is possible to accurately determine the difference (or the distance D).

As described above, even in a case where the difference between the first period and the second period is small (even in a case where the distance D is small), it is possible to accurately determine the difference (or the distance D), and thus, it is possible to decrease the interval Ps of the servo trace line T, and to decrease the recording track width Wd. Accordingly, it is possible to increase the number of recording tracks 5 included in one data band d, and thus, it is possible to further improve the recording density of the data.

Here, the peak in the reproduction waveform of the servo signal becomes sharp as the half width of the solitary waveform becomes narrow, and the reading accuracy of the servo signal is improved. Accordingly, the half width of the solitary waveform may be set to be less than or equal to 180 nm (refer to the first example to the twenty-first example), may be set to be less than or equal to 160 nm (refer to the second example to the fourth example, and the seventh example to the twenty-first example), may be set to be less than or equal to 140 nm (refer to the fourth example, the fifteenth example to the twenty-first example), or may be set to be less than or equal to 120 nm (refer to the seventeenth example, the twentieth example, and the twenty-first example).

In addition, the half width of the solitary waveform becomes narrow as the degree of vertical orientation of the magnetic layer 13 increases. Accordingly, the degree of vertical orientation may be set to be greater than or equal to 70% (refer to the third example and the fourth example, the fifteenth example to the seventeenth example, and the twentieth example and the twenty-first example), may be set to be greater than or equal to 75% (refer to the fifteenth example to the seventeenth example, and the twentieth example and the twenty-first example), or may be set to be greater than or equal to 80% (refer to the sixteenth example and the seventeenth example, and the twenty-first example).

In addition, in the present technology, the distance D (the distance between P1 and P2 in the length direction) is set to be greater than or equal to 0.08 μm (refer to the first example to the twenty-first example: in particular, refer to the tenth example). Accordingly, it is possible to prevent the system from being broken down.

Note that, it is advantageous that the present technology is applied to a case where the distance D is small, and the distance D is set to be less than or equal to 0.62 μm (refer to the first example to the twenty-first example: in particular, refer to the seventh example).

In addition, the degree of longitudinal orientation of the magnetic layer 13 is set to be less than or equal to 35% (refer to the first example to the twenty-first example: in particular, refer to the first example), and thus, even in a case where the difference between the first period and the second period is small (even in a case where the distance D is small), it is possible to more accurately determine the difference (or the distance D).

In addition, the coercive force in the longitudinal direction of the magnetic recording medium 1 is set to be less than or equal to 2000 Oe, and thus, even in a case where the difference between the first period and the second period is small (even in a case where the distance D is small), it is possible to more accurately determine the difference (or the distance D).

In addition, the ratio of the area of the servo band s to the area of the entire surface of the magnetic layer 13 is set to be less than or equal to 4.0%, and thus, the area of the data band d increases, and the recording capacity of the data can be improved. In addition, the width of the servo band s is set to be less than or equal to 95 µm, and thus, the width of the data band d increases, and the recording capacity of the data can be improved.

In addition, the recording track width Wd is set to be less than or equal to 2.0 µm, and thus, it is possible to increase the number of recording tracks 5 included in one data band d, and therefore, it is possible to further improve the recording density of the data.

In addition, the one-bit length in the longitudinal direction of the data signal recorded in the data band d is set to be less than or equal to 48 nm, and thus, it is possible to further improve the recording density of the data.

In addition, the thickness of the magnetic layer 13 is set to be less than or equal to 90 nm, and thus, it is possible to improve the electromagnetic conversion characteristics. In addition, the thickness of the magnetic layer 13 is set to be less than or equal to 90 nm, and thus, it is possible to make the peak in the reproduction waveform of the servo signal sharp by decreasing the half width of the solitary waveform in the reproduction waveform of the servo signal (less than or equal to 195 nm) (refer to the first example to the twenty-first example). Accordingly, the reading accuracy of the servo signal is improved, and thus, it is possible to improve the recording density of the data by increasing the number of recording tracks.

In addition, the particle volume (the average volume Vave) of the magnetic powder is set to be less than or equal to 2300 nm$^3$, and thus, it is possible to make the peak in the reproduction waveform of the servo signal by decreasing the half width of the solitary waveform in the reproduction waveform of the servo signal (less than or equal to 195 nm) (refer to the first example to the twenty-first example). Accordingly, the reading accuracy of the servo signal is improved, and thus, it is possible to improve the recording density of the data by increasing the number of recording tracks.

<Manufacturing Method of Magnetic Recording Medium>

Next, a manufacturing method of the magnetic recording medium 1 will be described. First, the non-magnetic powder, the binder, the lubricant, and the like are kneaded and dispersed in a solvent, and thus, a non-coating material for forming a magnetic layer is prepared. Next, the magnetic powder, the binder, the lubricant, and the like are kneaded and dispersed in a solvent, and thus, the coating material for forming a magnetic layer is prepared. Next, the binder, the non-magnetic powder, and the like are kneaded and dispersed in a solvent, and thus, a coating material for forming a back layer is prepared. The coating material for forming a magnetic layer, the non-coating material for forming a magnetic layer, and the coating material for forming a back layer can be prepared, for example, by using the following solvents, dispersion devices, and kneading devices.

Examples of a solvent that is used for preparing the coating material described above include a ketone-based solvent such as acetone, methyl ethyl ketone, methyl isobutyl ketone, and cyclohexanone, an alcohol-based solvent such as methanol, ethanol, and propanol, an ester-based solvent such as methyl acetate, ethyl acetate, butyl acetate, propyl acetate, ethyl lactate, and ethylene glycol acetate, an ether-based solvent such as diethylene glycol dimethyl ether, 2-ethoxy ethanol, tetrahydrofuran, and dioxane, an aromatic hydrocarbon-based solvent such as benzene, toluene, and xylene, a halogenated hydrocarbon-based solvent such as methylene chloride, ethylene chloride, carbon tetrachloride, chloroform, and chlorobenzene, and the like. Such solvents may be independently used, or may be used by being suitably mixed.

For example, a kneading device such as a continuous biaxial kneading machine, a continuous biaxial kneading machine in which dilution can be performed in multiple stages, a kneader, pressure kneader, and a roll kneader can be used as a kneading device that is used for preparing the coating material described above, but the kneading device is not particularly limited thereto. In addition, for example, a dispersion device such as a roll mill, a ball mill, a horizontal sand mill, a vertical sand mill, a spike mill, a pin mill, a tower mill, a pearl mill (for example, "DCP mill" manufactured by Eirich GmbH & Co KG, and the like), a homogenizer, and an ultrasonic disperser can be used as a dispersion device that is used for preparing the coating material described above, but the dispersion device is not particularly limited thereto.

Next, the non-coating material for forming a magnetic layer is applied onto one main surface of the base material 11 and is dried, and thus, the non-magnetic layer 12 is formed. Subsequently, the coating material for forming a magnetic layer is applied onto the non-magnetic layer 12 and is dried, and thus, the magnetic layer 13 is formed on the non-magnetic layer 12. Note that, when the drying is performed, for example, it is desirable that the magnetic powder is subjected to magnetic field orientation in the thickness direction of the base material 11 by a solenoid coil. In addition, when the drying is performed, for example, the magnetic powder may be subjected to the magnetic field orientation in the traveling direction of the base material 11 (the longitudinal direction), and then, may be subjected to the magnetic field orientation in the thickness direction of the base material 11, by the solenoid coil. The magnetic layer 13 is formed, and then, the coating material for forming a back layer is applied onto the other main surface of the base material 11 and is dried, and thus, the back layer 14 is formed. Accordingly, the magnetic recording medium 1 is obtained.

After that, the obtained magnetic recording medium 1 is subjected to a calender treatment, and the surface of the magnetic layer 13 is smoothed. Next, the magnetic recording medium 1 subjected to the calender treatment is wound into the shape of a roll, and then, in such a state, the magnetic recording medium 1 is subjected to a heating treatment, and thus, a plurality of protrusions 14A on the surface of the back layer 14 are transferred onto the surface of the magnetic layer 13. Accordingly, a plurality of hole portions 13A are formed on the surface of the magnetic layer 13.

It is desirable that the temperature of the heating treatment is higher than or equal to 55° C. and lower than or equal to 75° C. In a case where the temperature of the heating treatment is higher than or equal to 55° C., it is possible to obtain excellent transfer properties. On the other hand, in a case where the temperature of the heating treatment is higher than or equal to 75° C., a fine pore amount excessively increases, and thus, the lubricant on the surface excessively increases. Here, the temperature of the heating treatment is a temperature in an atmosphere in which the magnetic recording medium 1 is retained.

It is desirable that a time for the heating treatment is longer than or equal to 15 hours and shorter than or equal to 40 hours. In a case where the time for the heating treatment is longer than or equal to 15 hours, it is possible to obtain excellent transfer properties. On the other hand, in a case where the time for the heating treatment is shorter than or equal to 40 hours, it is possible to suppress a decrease in productivity.

Finally, the magnetic recording medium 1 is cut to have a predetermined width (for example, a width of ½ inches). As described above, the target magnetic recording medium 1 is obtained.

[Preparation Step of Coating Material for Forming Magnetic Layer]

Next, an adjustment step of the coating material for forming a magnetic layer will be described. First, a first composition of the following compounds was kneaded with an extruder. Next, the kneaded first composition, and a second composition of the following compounds were put into a stirring tank provided with a disperser, and were preliminarily mixed. Subsequently, sand mill mixing was further performed, and a filter treatment was performed, and thus, the coating material for forming a magnetic layer was prepared.

(First Composition)

Powder of Barium Ferrite ($BaFe_{12}O_{19}$) Particles (in the shape of a hexagonal plate, an aspect ratio of 2.8, and a particle volume of 1950 $nm^3$): 100 parts by mass Vinyl Chloride-Based Resin (30 mass % of a cyclohexanone solution): 10 parts by mass (a polymerization degree of 300, Mn=10000, having 0.07 mmol/g of $OSO_3K$ and 0.3 mmol/g of secondary OH as a polar group)

Aluminum Oxide Powder: 5 parts by mass ($\alpha$-$Al_2O_3$, an average particle diameter of 0.2 μm)

Carbon Black: 2 parts by mass (manufactured by Tokai Carbon Co., Ltd., Product Name: SEAST TA)

(Second Composition)

Vinyl Chloride-Based Resin: 1.1 parts by mass (Resin Solution: 30 mass % of a resin, and 70 mass % of cyclohexanone)

n-Butyl Stearate: 2 parts by mass

Methyl Ethyl Ketone: 121.3 parts by mass

Toluene: 121.3 parts by mass

Cyclohexanone: 60.7 parts by mass

Finally, 4 parts by mass of polyisocyanate (Product Name: CORONATE L, manufactured by Nippon Polyurethane Industry Co., Ltd.) and 2 parts by mass of a myristic acid were added to the coating material for forming a magnetic layer prepared as described above, as a curing agent.

[Preparation Step of Non-Coating Material for Forming Magnetic Layer]

Next, an adjustment step of the non-coating material for forming a magnetic layer will be described. First, a third composition of the following compounds was kneaded with an extruder.

Next, the kneaded third composition, and a fourth composition of the following compounds were put into a stirring tank provided with a disperser, and were preliminarily mixed. Subsequently, sand mill mixing was further performed, and a filter treatment was performed, and thus, the non-coating material for forming a magnetic layer was prepared.

(Third Composition)

Needle-Like Ferric Oxide Powder: 100 parts by mass ($\alpha$-$Fe_2O_3$, an average long axis length of 0.15 μm)

Vinyl Chloride-Based Resin: 55.6 parts by mass (Resin Solution: 30 mass % of a resin, and a 70 mass % of cyclohexanone)

Carbon Black: 10 parts by mass (an average particle diameter of 20 nm)

(Fourth Composition)

Polyurethane-Based Resin UR8200 (manufactured by TOYOBO CO., LTD.): 18.5 parts by mass n-Butyl Stearate: 2 parts by mass Methyl Ethyl Ketone: 108.2 parts by mass Toluene: 108.2 parts by mass Cyclohexanone: 18.5 parts by mass Finally, 4 parts by mass of polyisocyanate (Product Name: CORONATE L, manufactured by Nippon Polyurethane Industry Co., Ltd.) and 2 parts by mass of a myristic acid were added to the non-coating material for forming a magnetic layer prepared as described above, as a curing agent.

[Preparation Step of Coating Material for Forming Back Layer]

Next, an adjustment step of the coating material for forming a back layer will be described. The following raw materials were mixed with a stirring tank provided with a disperser, and were subjected to a filter treatment, and thus, the coating material for forming a back layer was prepared.

Powder of Carbon Black Particles (an average particle diameter of 20 nm): 90 parts by mass Powder of Carbon Black Particles (an average particle diameter of 270 nm): 10 parts by mass Polyester Polyurethane: 100 parts by mass (manufactured by Nippon Polyurethane Industry Co., Ltd., Product Name: N-2304)

Methyl Ethyl Ketone: 500 parts by mass

Toluene: 400 parts by mass

Cyclohexanone: 100 parts by mass

Note that, a type and a compounding amount of the inorganic particles may be changed as follows.

Powder of Carbon Black Particles (an average particle diameter of 20 nm): 80 parts by mass Powder of Carbon Black Particles (an average particle diameter of 270 nm): 20 parts by mass In addition, a type and a compounding amount of the inorganic particles may be changed as follows.

Powder of Carbon Black Particles (average particle diameter 270 nm): 100 parts by mass

[Coating Step]

The non-magnetic layer having an average thickness of 1.0 μm to 1.1 μm, and the magnetic layer having an average thickness 40 nm to 100 nm were formed on one main surface of an elongated polyethylene naphthalate film (hereinafter, referred to as a "PEN film") (for example, an average thickness of 4.0 μm) that is a non-magnetic support body, as follows by using the coating material for forming a magnetic layer and the non-coating material for forming a magnetic layer prepared as described above. First, the non-coating material for forming a magnetic layer was applied onto one main surface of the PEN film and was dried, and thus, the non-magnetic layer was formed. Next, the coating material for forming a magnetic layer was applied onto the non-magnetic layer and was dried, and thus, the magnetic layer was formed. Note that, when the coating material for forming a magnetic layer is dried, the magnetic powder was subjected to magnetic field orientation in the thickness direction of the film by a solenoid coil. Note that, the intensity of a magnetic field from the solenoid coil was adjusted (2 times to 3 times a retaining force of the magnetic powder), a solid content of the coating material for forming a magnetic layer was adjusted, a drying condition of the coating material for forming a magnetic layer (a drying temperature and a drying time) was adjusted, and a condition for orienting the magnetic powder in the magnetic field was adjusted, and thus, the orientation angle in the thickness direction of the magnetic recording medium (the vertical direction) and the orientation angle in the longitudinal direction were set to a predetermined value. Subsequently, the coating material for forming a back layer was applied onto the other main surface of the PEN film and was dried, and thus, the non-magnetic layer was formed. Accordingly, the magnetic recording medium was obtained. Note that, in order to increase the orientation angle, it is necessary to make a dispersion state of the coating material for forming a magnetic layer excellent. Further, in order to increase the degree of vertical orientation, a method is also effective in which the magnetic powder is magnetized in advance before the magnetic recording medium is put into an orientation device.

[Calender Step and Transfer Step]

Subsequently, a calender treatment was performed, and thus, the surface of the magnetic layer was smoothed. Next, the obtained magnetic recording medium was wound into the shape of a roll, and then, in such a state, the magnetic recording medium was subjected to a heating treatment twice at 60° C. for 10 hours. Accordingly, the plurality of protrusions on the surface of the back layer were transferred onto the surface of the magnetic layer, and thus, the plurality of hole portions were formed on the surface of the magnetic layer.

[Cutting Step]

The magnetic recording medium obtained as described above was cut to have a width of ½ inches (12.65 mm). Accordingly, a target elongated magnetic recording medium was obtained.

<Details of Non-Magnetic Layer>

Subsequently, the details of non-magnetic layer 12 will be described.

In general, in order to increase the storage capacity per one tape cartridge, it is sufficient to increase the entire length of a magnetic tape. On the other hand, it is necessary to increase the entire length of the magnetic tape and to decrease the total thickness of the magnetic tape, from a restriction in a cartridge external size. In the thickness of the entire magnetic tape, a base film (the base material) and the non-magnetic layer occupy the majority, and thus, the thinning of the base film and the non-magnetic layer is effective. The thinning of the base film is problematic in the handling of a manufacturing process, and thus, it is practical to perform the thinning of the non-magnetic layer. As the current situation, it is possible to simply decrease a coating thickness of the non-magnetic layer, but there is a case where tape surface properties are degraded due to the thinning of the non-magnetic layer, from a relationship between a particle size of the non-magnetic particles contained in the non-magnetic layer and the coating thickness. In order to solve such a problem, it is necessary to set the particle size (the volume) of the non-magnetic particles to be less than or equal to a certain value.

Here, the tape surface properties indicate arithmetic average roughness Ra of the surface of the magnetic tape (the magnetic recording medium) on the magnetic layer side that is measured by atomic force-microscopy (AFM). In a case where the arithmetic average roughness Ra is greater than an allowable value of the tape surface, a distance between the magnetic tape and the recording and reproducing head element increases, and thus, signal quality in the record and the reproduction of a high-density signal decreases. Such a problem becomes significant as the thickness of the magnetic layer decreases.

According to a test of the present inventors, in a case where the thickness of the magnetic layer is less than or equal to 90 nm, the allowable value described above is approximately 2.0 nm. Therefore, in this embodiment, the average particle volume of the non-magnetic powder configuring the non-magnetic layer 12 is set to be less than or equal to a certain value such that the arithmetic average roughness Ra of the tape surface is less than or equal to 2.0 nm, and thus, the tape surface properties is controlled.

It is desirable the average particle volume of the configuring the non-magnetic powder non-magnetic layer 12 is less than or equal to $2.0 \times 10^{-5}$ $\mu m^3$, and it is more desirable that the average particle volume is less than or equal to $1.0 \times 10^{-5}$ $\mu m^3$. The average particle volume of the non-magnetic powder configuring the non-magnetic layer 12 is set to be less than or equal to $2.0 \times 10^{-5}$ $\mu m^3$, and thus, even in a case where the thickness of the non-magnetic layer 12 is less than or equal to 1.1 $\mu m$, it is possible to suppress the arithmetic average roughness Ra of the surface of the magnetic layer 13 having a thickness of less than or equal to 90 nm to be less than or equal to 2.0 nm. Further, the average particle volume of the non-magnetic powder configuring the non-magnetic layer 12 is set to be less than or equal to $1.0 \times 10^{-5}$ $\mu m^3$, and thus, it is possible to further decrease the arithmetic average roughness Ra of the surface of the magnetic layer having a thickness of less than or equal to 90 nm, or even in a case where the thickness of the non-magnetic layer 12 is greater than or equal to 0.6 $\mu m$ and less than or equal to 0.8 $\mu m$, it is possible to suppress the arithmetic average roughness Ra of the surface of the magnetic layer 13 having a thickness of less than or equal to 90 nm to be less than or equal to 2.0 nm.

Here, the arithmetic average roughness Ra is obtained as follows.

First, the surface of the magnetic layer is observed with AFM, and an AFM image of 40 $\mu m \times 40$ $\mu m$ is obtained. Nano Scope IIIa D3100 manufactured by DIGITAL INSTRUMENTS CORPORATION is used as the AFM, and a silicon single crystal cantilever is used as a cantilever.

Next, the AFM image is divided into 256×256 (=65536) measurement points, a height $Z(i)$ (i: a measurement point number, i=1 to 65536) is measured at each of the measurement points, and the heights $Z(i)$ each of the measured measurement points are simply averaged (arithmetically averaged), and thus, an average height (average surface) Zave $(=(Z(1)+Z(2)+ \ldots +Z(65536))/65536)$ is obtained. Subsequently, a deviation $Z''(i)$ from an average center line $(=Z(i)-Zave)$ is obtained at each of the measurement points, and thus, arithmetic average roughness Ra [nm] $(=(Z''(1)+Z''(2)+ \ldots +Z''(65536))/65536)$ is calculated.

The average particle volume of the non-magnetic powder is obtained as follows. Hereinafter, a calculation method of an average particle volume of Fe-based non-magnetic particles will be described, as the non-magnetic powder.

First, slicing is performed in accordance with an FIB method (a $\mu$-sampling method) as a sample pretreatment. The slicing is performed along the length direction of the magnetic tape (the longitudinal direction). A sectional surface of a thin piece sample that is obtained is observed by using a transmission electron microscope (H-9500 manufactured by Hitachi High-Technologies Corporation) such that the range of the recording layer from the base material is included at an acceleration voltage of 300 kV and the total magnification of 250,000 times. In a TEM image of the sectional surface that is obtained, 50 Fe-based non-magnetic particles are specified with respect to the particles contained in the non-magnetic layer 12 by using micro-electron diffraction method. The electron diffraction is performed by using a transmission electron microscope (JEM-ARM200F manufactured by JEOL Ltd.), in a condition of an acceleration voltage of 200 kV, a camera length of 0.8 m, and a beam diameter of approximately 1 nmΦ.

Subsequently, the average particle volume is obtained by using 50 Fe-based non-magnetic particles that are extracted as described above. First, the long axis length DL and the short axis length DS of each of the particles are measured. Here, the long axis length DL indicates the lines maximum distance between two parallel lines drawn from all angles to be in contact with the outline of the particles (a so-called maximum Feret diameter). On the other hand, the short axis length DS indicates the maximum length of the magnetic powder in a direction orthogonal to a long axis of the magnetic powder. Subsequently, the long axis lengths DL of 50 particles that are measured are simply averaged (arithmetically averaged), and thus, the average long axis length DLave is obtained. Then, the average long axis length DLave that is obtained as described above is set to the average particle size of the non-magnetic powder. In addition, the short axis lengths DS of 50 particles that are measured are simply averaged (arithmetically averaged), and thus, the average short axis length DSave is obtained. Next, the average volume Vave (the particle volume) of the particles is obtained by the following expression, from the average long axis length DLave and the average short axis length DSave.

$$Vave = \pi/6 \times DSave^2 \times DLave$$

FIG. 13 illustrates an example of the particle size of the non-magnetic powder (the Fe-based non-magnetic particles) having an average particle volume of less than or equal to $2.0 \times 10^{-5}$ μm$^3$. The particles are in the shape of a needle or a spindle, and a long axis length and a short axis length respectively correspond to the average long axis length and the average short axis length. It is possible to obtain the non-magnetic powder having an average particle volume of less than or equal to $2.0 \times 10^{-5}$ μm$^3$ in a range where a long axis length is greater than or equal to 12 nm and less than or equal to 110 nm, a short axis length is greater than or equal to 6 nm and less than or equal to 20 nm, and an aspect ratio is greater than or equal to 1.8 and less than or equal to 6.1.

Next, the present inventors have prepared samples of a plurality of types of magnetic tapes (corresponding to the magnetic recording medium 1 of FIG. 1) including the non-magnetic layer that contains the non-magnetic powder illustrated in FIG. 13, and have measured the arithmetic average roughness Ra of the surface of each of the magnetic layers. The results are shown in FIG. 14.

(Sample 1)

The non-magnetic layer 12 having a thickness of 1.1 μm and the magnetic layer 13 having a thickness of 80 nm were formed on one main surface of the base material 11 having a thickness of 4 μm, and the back layer 14 having a thickness of 0.4 μm was formed on the other main surface of the base material 11, and thus, the magnetic recording medium 1 having the total thickness of 5.58 μm was prepared. Fe-based non-magnetic particles having an average particle volume of $1.9 \times 10^{-5}$ μm$^3$ (corresponding to a non-magnetic powder No. 1 shown in FIG. 13) were used as the non-magnetic powder contained in the non-magnetic layer 12. The arithmetic average roughness Ra of the surface of the magnetic layer 13 of the prepared magnetic recording medium 1 was measured by the method described above, and thus, was 1.90 nm.

(Sample 2)

The non-magnetic layer 12 having a thickness of 0.6 μm and the magnetic layer 13 having a thickness of 60 nm were formed on one main surface of the base material 11 having a thickness of 3.6 μm, and the back layer 14 having a thickness of 0.4 μm was formed on the other main surface of the base material 11, and thus, the magnetic recording medium 1 having the total thickness of 4.66 μm was prepared. Fe-based non-magnetic particles having an average particle volume of $6.5 \times 10^{-6}$ μm$^3$ (corresponding to a non-magnetic powder No. 2 shown in FIG. 13) were used as the non-magnetic powder contained in the non-magnetic layer 12. The arithmetic average roughness Ra of the surface of the magnetic layer 13 of the prepared magnetic recording medium 1 was measured by the method described above, and thus, was 1.82 nm.

(Sample 3)

The non-magnetic layer 12 having a thickness of 1.1 μm and the magnetic layer 13 having a thickness of 70 nm were formed on one main surface of the base material 11 having a thickness of 4 μm, and the back layer 14 having a thickness of 0.4 μm was formed on the other main surface of the base material 11, and thus, the magnetic recording medium 1 having the total thickness of 5.57 μm was prepared. Fe-based non-magnetic particles having an average particle volume of $8.0 \times 10^{-6}$ μm$^3$ (corresponding to a non-magnetic powder No. 3 shown in FIG. 13) were used as the non-magnetic powder contained in the non-magnetic layer 12. The arithmetic average roughness Ra of the surface of the magnetic layer 13 of the prepared magnetic recording medium 1 was measured by the method described above, and thus, was 1.70 nm.

(Sample 4)

The non-magnetic layer 12 having a thickness of 0.6 μm and the magnetic layer 13 having a thickness of 70 nm were formed on one main surface of the base material 11 having a thickness of 4 μm, and the back layer 14 having a thickness of 0.4 μm was formed on the other main surface of the base material 11, and thus, the magnetic recording medium 1 having the total thickness of 5.07 μm was prepared. Fe-based non-magnetic particles having an average particle volume of $2.1 \times 10^{-6}$ μm$^3$ (corresponding to a non-magnetic powder No. 4 shown in FIG. 13) were used as the non-magnetic powder contained in the non-magnetic layer 12. The arithmetic average roughness Ra of the surface of the magnetic layer 13 of the prepared magnetic recording medium 1 was measured by the method described above, and thus, was 1.62 nm.

(Sample 5)

The non-magnetic layer 12 having a thickness of 1.1 μm and the magnetic layer 13 having a thickness of 70 nm were formed on one main surface of the base material 11 having a thickness of 3.6 μm, and the back layer 14 having a thickness of 0.4 μm was formed on the other main surface of the base material 11, and thus, the magnetic recording medium 1 having the total thickness of 5.17 μm was prepared. Fe-based non-magnetic particles having an average particle volume of $1.3 \times 10^{-6}$ m$^3$ (corresponding to a non-magnetic powder No. 5 shown in FIG. 13) were used as the non-magnetic powder contained in the non-magnetic layer 12. The arithmetic average roughness Ra of the surface of the magnetic layer 13 of the prepared magnetic recording medium 1 was measured by the method described above, and thus, was 1.60 nm.

(Sample 6)

The non-magnetic layer 12 having a thickness of 0.6 μm and the magnetic layer 13 having a thickness of 70 nm were formed on one main surface of the base material 11 having a thickness of 4 μm, and the back layer 14 having a thickness of 0.4 μm was formed on the other main surface of the base material 11, and thus, the magnetic recording medium 1 having the total thickness of 5.07 μm was prepared. Fe-based non-magnetic particles having an average particle volume of $8.0\times10^{-6}$ μm$^3$ (corresponding to a non-magnetic powder No. 3 shown in FIG. 13) were used as the non-magnetic powder contained in the non-magnetic layer 12. The arithmetic average roughness Ra of the surface of the magnetic layer 13 of the prepared magnetic recording medium 1 was measured by the method described above, and thus, was 1.79 nm.

(Sample 7)

The non-magnetic layer 12 having a thickness of 0.6 μm and the magnetic layer 13 having a thickness of 70 nm were formed on one main surface of the base material 11 having a thickness of 3.6 μm, and the back layer 14 having a thickness of 0.4 μm was formed on the other main surface of the base material 11, and thus, the magnetic recording medium 1 having the total thickness of 4.67 μm was prepared. Fe-based non-magnetic particles having an average particle volume of $2.1\times10^{-6}$ μm$^3$ (corresponding to a non-magnetic powder No. 4 shown in FIG. 13) were used as the non-magnetic powder contained in the non-magnetic layer 12. The arithmetic average roughness Ra of the surface of the magnetic layer 13 of the prepared magnetic recording medium 1 was measured by the method described above, and thus, was 1.65 nm.

(Sample 8)

The non-magnetic layer 12 having a thickness of 0.8 μm and the magnetic layer 13 having a thickness of 70 nm were formed on one main surface of the base material 11 having a thickness of 3.8 μm, and the back layer 14 having a thickness of 0.4 μm was formed on the other main surface of the base material 11, and thus, the magnetic recording medium 1 having a the total thickness of 5.07 μm was prepared. Fe-based non-magnetic particles having an average particle volume of $1.3\times10^{-6}$ μm$^3$ (corresponding to a non-magnetic powder No. 5 shown in FIG. 13) were used as the non-magnetic powder contained in the non-magnetic layer 12. The arithmetic average roughness Ra of the surface of the magnetic layer 13 of the prepared magnetic recording medium 1 was measured by the method described above, and thus, was 1.68 nm.

In Samples 1 to 8, the thickness of the non-magnetic layer and the average particle volume of the Fe-based non-magnetic particles are changed. From an evaluation result of Samples 1 to 8, even in a case where the thickness of the non-magnetic layer is less than or equal to 1.1 μm, it is possible to suppress the arithmetic average roughness Ra of the surface of the magnetic layer to be less than or equal to 2.0 nm by using the Fe-based non-magnetic particles having an average particle volume of less than or equal to $2.0\times10^{-5}$ μm$^3$. In addition, even in a case where the thickness of the non-magnetic layer is 0.6 μm, it is possible to suppress the arithmetic average roughness Ra of the surface of the magnetic layer to be less than or equal to 2.0 nm by using the Fe-based non-magnetic particles having an average particle volume of less than or equal to $1.0\times10^{-5}$ μm$^3$.

In Sample 2, the thickness of the base material and the non-magnetic layer decreases, and the volume of the Fe-based non-magnetic particles is reduced to be less than or equal to a half, compared to Sample 1. The volume of the Fe-based non-magnetic particles is reduced, and thus, the arithmetic average roughness Ra of the surface of the magnetic layer that is less than or equal to that of Sample 1 can be realized.

In Sample 3, a thickness configuration is identical to that of Sample 1, except that the thickness of the magnetic layer decreases. In addition, the volume of the Fe-based non-magnetic particles is reduced, and thus, the arithmetic average roughness Ra of less than or equal to that of Sample 1 is realized.

In Sample 4, the thickness of the non-magnetic layer decreases, but the volume of the Fe-based non-magnetic particles is reduced, and thus, the arithmetic average roughness Ra of less than or equal to that of Sample 1 is also realized.

In Sample 5, the thickness of the non-magnetic layer is identical to that of Sample 1, but the thickness of the base material decreases, and thus, the total thickness of the tape decreases. Finer particles are used as the Fe-based non-magnetic particles, and thus, it is possible to reduce the arithmetic average roughness Ra of the surface of the magnetic layer.

In Sample 6, the thickness of the non-magnetic layer in Sample 3 decreases. According to such thinning, the arithmetic average roughness Ra of the surface of the magnetic layer is slightly degraded, but excellent arithmetic average roughness Ra is realized compared to Sample 1.

VARIOUS MODIFICATION EXAMPLES

The present technology can also be configured as follows.

(1) A magnetic recording medium in a shape of a tape that is long in a longitudinal direction and is short in a width direction, the medium including:

a base material;

a magnetic layer; and a non-magnetic layer that is provided between the base material and the magnetic layer, and contains one or more types of non-magnetic inorganic particles, in which the magnetic layer includes a data band long in the longitudinal direction in which a data signal is to be written, and a servo band long in the longitudinal direction in which a servo signal is written, and in the magnetic layer, a degree of vertical orientation is greater than or equal to 65%, a half width of a solitary waveform in a reproduction waveform of the servo signal is less than or equal to 195 nm, and a thickness of the magnetic layer is less than or equal to 90 nm, and the non-magnetic layer contains at least Fe-based non-magnetic particles as the non-magnetic inorganic particles, and in the non-magnetic layer, an average particle volume of the Fe-based non-magnetic particles is less than or equal to $2.0\times10^{-5}$ μm$^3$, and a thickness of the non-magnetic layer is less than or equal to 1.1 μm.

(2) The magnetic recording medium according to (1) described above, in which the average particle volume of the Fe-based non-magnetic particles is less than or equal to $1.0\times10^{-5}$ μm$^3$.

(3) The magnetic recording medium according to (1) or (2) described above, in which the half width of the solitary waveform is less than or equal to 180 nm.

(4) The magnetic recording medium according to (3) described above, in which the half width of the solitary waveform is less than or equal to 160 nm.

(5) The magnetic recording medium according to (4) described above, in which the half width of the solitary waveform is less than or equal to 140 nm.

(6) The magnetic recording medium according to (5) described above, in which the half width of the solitary waveform is less than or equal to 120 nm.

(7) The magnetic recording medium according to any one of (1) to (6) described above, in which the degree of vertical orientation is greater than or equal to 70%.

(8) The magnetic recording medium according to (7) described above, in which the degree of vertical orientation is greater than or equal to 75%.

(9) The magnetic recording medium according to (8) described above, in which the degree of vertical orientation is greater than or equal to 80%.

(10) The magnetic recording medium according to any one of (1) to (9) described above, in which the data band includes a plurality of recording tracks that are long in the longitudinal direction, are arrayed in the width direction, and have a predetermined recording track width for each track in the width direction, a servo signal recording pattern includes a plurality of stripes that are inclined at a predetermined azimuth angle with respect to the width direction, and when an arbitrary point on an arbitrary stripe in the plurality of stripes is set to P1, and a point on the arbitrary stripe in a position separated from P1 by the recording track width in the width direction is set to P2, a distance between P1 and P2 in the length direction is greater than or equal to 0.08 μm.

(11) The magnetic recording medium according to (10) described above, in which the distance between P1 and P2 in the length direction is less than or equal to 0.62 μm.

(12) The magnetic recording medium according to any one of (1) to (11) described above, in which in the magnetic layer, a degree of longitudinal orientation is less than or equal to 35%.

(13) The magnetic recording medium according to any one of (1) to (12) described above, in which in the magnetic recording medium, a coercive force in the longitudinal direction is less than or equal to 2000 Oe.

(14) The magnetic recording medium according to any one of (1) to (13) described above, in which a ratio of an area of the servo band to an area of an entire surface of the magnetic layer is less than or equal to 4.0%.

(15) The magnetic recording medium according to any one of (1) to (14) described above, in which the magnetic layer contains a magnetic powder, and a particle volume of the magnetic powder is less than or equal to 2300 $nm^3$.

(16) The magnetic recording medium according to any one of (1) to (15) described above, in which the number of data bands is 4n (n is an integer of greater than or equal to 2), and the number of servo bands is 4n+1.

(17) The magnetic recording medium according to any one of (1) to (16) described above, in which a width of the servo band is less than or equal to 95 μm.

(18) The magnetic recording medium according to any one of (1) to (17) described above, in which the data band includes a plurality of recording tracks that are long in the longitudinal direction, are arrayed in the width direction, and have a predetermined recording track width for each track in the width direction, and the recording track width is less than or equal to 2.0 μm.

(19) The magnetic recording medium according to any one of (1) to (18) described above, in which a one-bit length in the longitudinal direction of the data signal that is recorded in the data band is less than or equal to 48 nm.

(20) The magnetic recording medium according to any one of (1) to (19) described above, in which the magnetic layer contains a magnetic powder of hexagonal ferrite, ε ferric oxide, or cobalt-containing ferrite.

(21) The magnetic recording medium according to any one of (1) to (20) described above, in which a thickness of the base material is less than or equal to 4.2 μm.

(22) The magnetic recording medium according to any one of (1) to (21) described above, in which the Fe-based non-magnetic inorganic particles are hematite ($\alpha$-$Fe_2O_3$).

(23) A cartridge including:

a magnetic recording medium in a shape of a tape that is long in a longitudinal direction and is short in a width direction, the magnetic recording medium including a base material, a magnetic layer, and a non-magnetic layer that is provided between the base material and the magnetic layer, and contains one or more types of non-magnetic inorganic particles, in which the magnetic layer includes a data band long in the longitudinal direction in which a data signal is to be written, and a servo band long in the longitudinal direction in which a servo signal is written, and in the magnetic layer, a degree of vertical orientation is greater than or equal to 65%, a half width of a solitary waveform in a reproduction waveform of the servo signal is less than or equal to 195 nm, and a thickness of the magnetic layer is less than or equal to 90 nm, and the non-magnetic layer contains at least Fe-based non-magnetic particles as the non-magnetic inorganic particles, and in the non-magnetic layer, an average particle volume of the Fe-based non-magnetic particles is less than or equal to $2.0 \times 10^{-5}$ $\mu m^3$, and a thickness of the non-magnetic layer is less than or equal to 1.1 μm.

REFERENCE SIGNS LIST d data band
s servo band
5 recording track
6 servo signal
7 stripe
1 magnetic recording medium
11 base material
12 non-magnetic layer
13 magnetic layer
14 back layer
20 data recording device

The invention claimed is:

1. A magnetic recording medium in a shape of a tape that is long in a longitudinal direction and is short in a width direction, the medium comprising:

a base material;

a magnetic layer; and a non-magnetic layer that is provided between the base material and the magnetic layer, and contains one or more types of non-magnetic inorganic particles, wherein the magnetic layer includes a data band long in the longitudinal direction in which a data signal is to be written, and a servo band long in the longitudinal direction in which a servo signal is written, and in the magnetic layer, a degree of vertical orientation is greater than or equal to 65%, a half width of a solitary waveform in a reproduction waveform of the servo signal is less than or equal to 195 nm, and a thickness of the magnetic layer is less than or equal to 90 nm, and the non-magnetic layer contains at least Fe-based non-magnetic particles as the non-magnetic inorganic particles, and in the non-magnetic layer, an average particle volume of the Fe-based non-magnetic particles is less than or equal to $2.0 \times 10^{-5}$ µm$^3$, and a thickness of the non-magnetic layer is less than or equal to 1.1 µm.

2. The magnetic recording medium according to claim 1, wherein
the average particle volume of the Fe-based non-magnetic particles is less than or equal to $1.0 \times 10^{-5}$ µm$^3$.

3. The magnetic recording medium according to claim 1, wherein
the half width of the solitary waveform is less than or equal to 180 nm.

4. The magnetic recording medium according to claim 3, wherein
the half width of the solitary waveform is less than or equal to 160 nm.

5. The magnetic recording medium according to claim 4, wherein
the half width of the solitary waveform is less than or equal to 140 nm.

6. The magnetic recording medium according to claim 5, wherein
the half width of the solitary waveform is less than or equal to 120 nm.

7. The magnetic recording medium according to claim 1, wherein
the degree of vertical orientation is greater than or equal to 70%.

8. The magnetic recording medium according to claim 7, wherein
the degree of vertical orientation is greater than or equal to 75%.

9. The magnetic recording medium according to claim 8, wherein
the degree of vertical orientation is greater than or equal to 80%.

10. The magnetic recording medium according to claim 1, wherein
the data band includes a plurality of recording tracks that are long in the longitudinal direction, are arrayed in the width direction, and have a predetermined recording track width for each track in the width direction,
a servo signal recording pattern includes a plurality of stripes that are inclined at a predetermined azimuth angle with respect to the width direction, and
when an arbitrary point on an arbitrary stripe in the plurality of stripes is set to P1, and a point on the arbitrary stripe in a position separated from P1 by the recording track width in the width direction is set to P2, a distance between P1 and P2 in the length direction is greater than or equal to 0.08 µm.

11. The magnetic recording medium according to claim 10, wherein
the distance between P1 and P2 in the length direction is less than or equal to 0.62 µm.

12. The magnetic recording medium according to claim 1, wherein
in the magnetic layer, a degree of longitudinal orientation is less than or equal to 35%.

13. The magnetic recording medium according to claim 1, wherein
in the magnetic recording medium, a coercive force in the longitudinal direction is less than or equal to 2000 Oe.

14. The magnetic recording medium according to claim 1, wherein
a ratio of an area of the servo band to an area of an entire surface of the magnetic layer is less than or equal to 4.0%.

15. The magnetic recording medium according to claim 1, wherein
the magnetic layer contains a magnetic powder, and
a particle volume of the magnetic powder is less than or equal to 2300 nm$^3$.

16. The magnetic recording medium according to claim 1, wherein
the number of data bands is 4n (n is an integer of greater than or equal to 2), and the number of servo bands is 4n+1.

17. The magnetic recording medium according to claim 1, wherein
a width of the servo band is less than or equal to 95 µm.

18. The magnetic recording medium according to claim 1, wherein
the data band includes a plurality of recording tracks that are long in the longitudinal direction, are arrayed in the width direction, and have a predetermined recording track width for each track in the width direction, and
the recording track width is less than or equal to 2.0 µm.

19. The magnetic recording medium according to claim 1, wherein
a one-bit length in the longitudinal direction of the data signal that is recorded in the data band is less than or equal to 48 nm.

20. The magnetic recording medium according to claim 1, wherein the magnetic layer contains a magnetic powder of hexagonal ferrite, ε ferric oxide, or cobalt-containing ferrite.

21. The magnetic recording medium according to claim 1, wherein
a thickness of the base material is less than or equal to 4.2 µm.

22. The magnetic recording medium according to claim 1, wherein
the Fe-based non-magnetic inorganic particles are hematite ($\alpha$-Fe$_2$O$_3$).

23. A cartridge comprising:
a magnetic recording medium in a shape of a tape that is long in a longitudinal direction and is short in a width direction, the magnetic recording medium including a base material, a magnetic layer, and a non-magnetic layer that is provided between the base material and the magnetic layer, and contains one or more types of non-magnetic inorganic particles, wherein
the magnetic layer includes a data band long in the longitudinal direction in which a data signal is to be written, and a servo band long in the longitudinal direction in which a servo signal is written, and in the magnetic layer, a degree of vertical orientation is greater than or equal to 65%, a half width of a solitary waveform in a reproduction waveform of the servo signal is less than or equal to 195 nm, and a thickness of the magnetic layer is less than or equal to 90 nm, and
the non-magnetic layer contains at least Fe-based non-magnetic particles as the non-magnetic inorganic particles, and in the non-magnetic layer, an average particle volume of the Fe-based non-magnetic particles is less than or equal to $2.0 \times 10^{-5}$ µm³, and a thickness of the non-magnetic layer is less than or equal to 1.1 µm.

* * * * *